(12) United States Patent
Yamazaki

(10) Patent No.: US 8,914,178 B2
(45) Date of Patent: Dec. 16, 2014

(54) HYBRID VEHICLE

(75) Inventor: Makoto Yamazaki, Gotenba (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/883,943

(22) PCT Filed: Nov. 8, 2010

(86) PCT No.: PCT/JP2010/069814
§ 371 (c)(1),
(2), (4) Date: May 7, 2013

(87) PCT Pub. No.: WO2012/063299
PCT Pub. Date: May 18, 2012

(65) Prior Publication Data
US 2013/0226389 A1    Aug. 29, 2013

(51) Int. Cl.
| | | |
|---|---|---|
| *B60L 11/00* | (2006.01) | |
| *G06F 7/00* | (2006.01) | |
| *G06F 17/00* | (2006.01) | |
| *B60W 10/08* | (2006.01) | |
| *B60W 10/06* | (2006.01) | |
| *B60W 20/00* | (2006.01) | |
| *B60K 6/442* | (2007.10) | |
| *B60K 6/445* | (2007.10) | |
| *B60W 10/26* | (2006.01) | |
| *B60W 30/192* | (2012.01) | |

(52) U.S. Cl.
CPC ............. *B60W 20/20* (2013.01); *Y02T 10/6239* (2013.01); *B60W 10/08* (2013.01); *B60W 10/06* (2013.01); *B60W 2710/0627* (2013.01); *B60W 20/106* (2013.01); *B60K 6/442* (2013.01); *B60K 6/445* (2013.01); *Y02T 10/6286* (2013.01); *B60W 10/26* (2013.01); *B60W 30/192* (2013.01); *B60W 20/00* (2013.01); *B60W 2710/083* (2013.01)
USPC .............................................. 701/22

(58) Field of Classification Search
USPC .......................................................... 701/22
See application file for complete search history.

(56) References Cited

U.S. PATENT DOCUMENTS

2007/0284161 A1    12/2007  Ohno

FOREIGN PATENT DOCUMENTS

| JP | 2000-204997 A | 7/2000 |
| JP | 2005-180230 A | 7/2005 |
| JP | 2006-132337 A | 5/2006 |
| JP | 2008-296619 A | 12/2008 |
| JP | 2010-221897 A | 10/2010 |

*Primary Examiner* — Mary Cheung
*Assistant Examiner* — Anne Mazzara
(74) *Attorney, Agent, or Firm* — Kenyon & Kenyon LLP

(57) ABSTRACT

In the case that an engine is started in a motor drive priority mode, a first motor and a second motor are controlled in a range of an input limit and an output limit of a battery, such that the first motor outputs a torque for motoring, and the second motor outputs the sum of a required torque and a torque of cancelling out a torque output from the first motor and applied to a driveshaft. Concurrently, the engine is controlled, such that the engine is started with increased fuel supply, compared with the case that the engine is started in a hybrid drive priority mode.

4 Claims, 11 Drawing Sheets

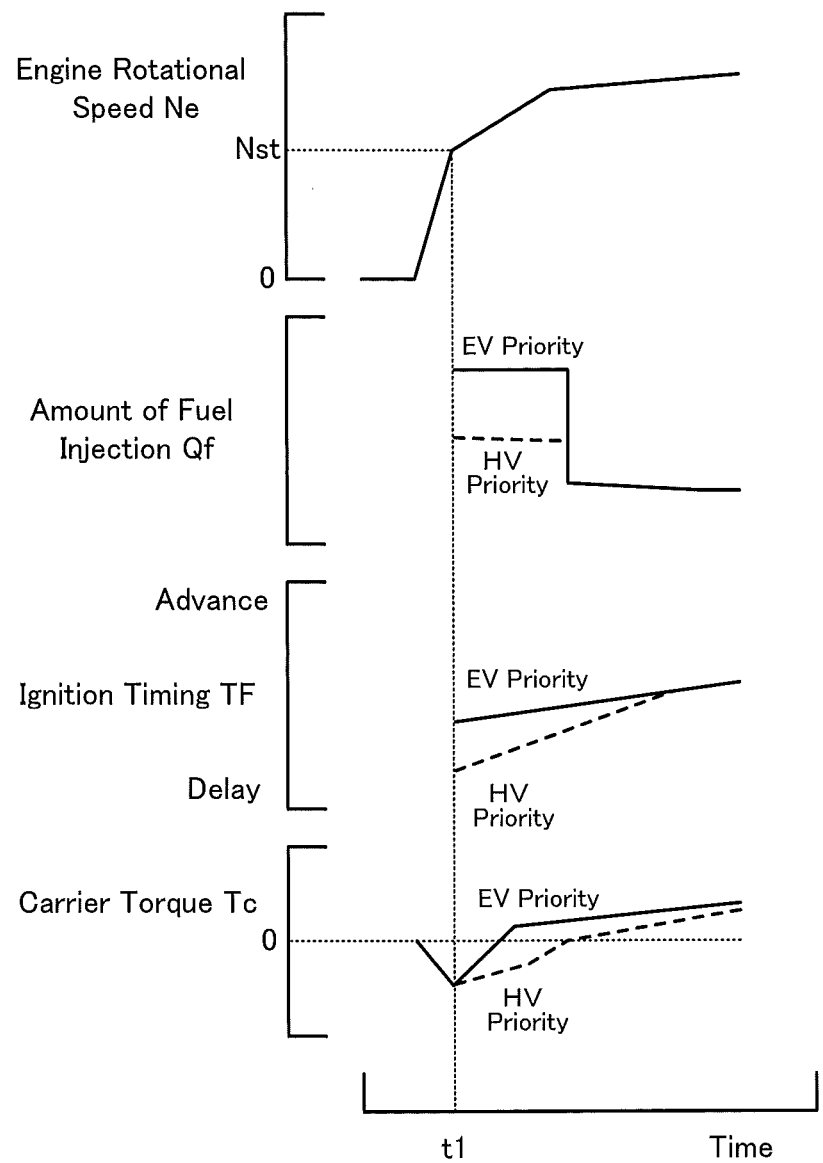

HYBRID VEHICLE

This is a 371 national phase application of PCT/JP2010/069814 filed 08 Nov. 2010, the contents of which are incorporated herein by reference.

TECHNICAL FIELD

The present invention relates to a hybrid vehicle and more specifically a hybrid vehicle that includes an internal combustion engine; a generator having power input and output capabilities; a planetary gear mechanism having three rotational elements respectively connected with three shafts, i.e., a driveshaft linked with an axle, an output shaft of the internal combustion engine and a rotating shaft of the generator; a motor having power input and output capabilities from and to the driveshaft; and a secondary battery having electric power transmission capability to and from the generator and the motor and that enables a hybrid drive with both the power output from the internal combustion engine and the power input from and output to the motor and a motor drive with only the power input from and output to the motor.

BACKGROUND ART

One proposed configuration of this hybrid vehicle has: an engine; a first motor-generator; a planetary gear mechanism having three shafts respectively connected with an output shaft of the engine, a rotating shaft of the first motor-generator and a driveshaft linked with drive wheels; a second motor-generator connected with the driveshaft; and a battery operated to transmit electric power to and from the first motor-generator and the second motor-generator, wherein during a vehicle stop, the engine is cranked and started by driving the first motor-generator with a maximum cranking torque set according to the maximum electric power output from the battery and a potential energy loss during cranking (see, for example, Patent Document 1). This hybrid vehicle enables the engine to be smoothly started by the above control.

PRIOR ART DOCUMENT

Patent Document

Patent Document 1: Japanese Patent Laid-Open No. 2005-180230A

SUMMARY OF THE INVENTION

One of the recently proposed configurations of the hybrid vehicle is a plug-in hybrid vehicle that is connected to an external power source during a system stop to charge the battery with electric power from the external power source. The plug-in hybrid vehicle is capable of charging the battery during a system stop. In order to reduce the state of charge of the battery prior to the system stop, this plug-in hybrid vehicle is driven in a motor drive priority mode that gives priority to a motor drive using only the power from the second motor-generator with stopping operation of the engine to a hybrid drive using both the power from the engine and the power from the second motor-generator. When the driver presses down an accelerator pedal to require a drive with the larger driving force during the motor drive in this drive mode, the power from the second motor-generator is insufficient to output the required driving force, so that the hybrid drive is started with starting the engine. When the state of charge of the battery decreases to a certain extent by the motor drive in the motor drive priority mode, the drive mode is changed over to a hybrid drive priority mode that gives priority to the hybrid drive over the motor drive. In the hybrid vehicle of this configuration, when the engine is motored and started by the first motor-generator during drive in the motor drive priority mode that requires the relatively large driving force, a shock may be caused by failure to sufficiently cancel out the torque output from the first motor-generator and applied to the driveshaft via the planetary gear mechanism by the torque output from the second motor-generator. A shock may also be caused by the start of application of a torque of increasing the rotational speed of the engine (positive engine torque) to the planetary gear mechanism on the start of fuel injection and ignition of the engine to the first igniting state. The driver may separately feel the shock caused by motoring the engine and the shock caused by the start of application of the positive engine torque to the planetary gear mechanism.

The hybrid vehicle of the invention is thus mainly directed to prevent the driver from feeling shocks a plurality of different times when the internal combustion engine is motored and started by the generator during drive in the motor drive priority mode.

In order to solve at least part of the foregoing, the invention provides various aspects and embodiments described below.

According to one aspect, the present invention is directed to a hybrid vehicle including: an internal combustion engine; a generator having power input and output capabilities; a planetary gear mechanism having three rotational elements respectively connected with three shafts, i.e., a driveshaft linked with an axle, an output shaft of the internal combustion engine and a rotating shaft of the generator; a motor having power input and output capabilities from and to the driveshaft; and a secondary battery having electric power transmission capability to and from the generator and the motor, the hybrid vehicle enabling a hybrid drive with both power output from the internal combustion engine and power input from and output to the motor and a motor drive with only the power input from and output to the motor. The hybrid vehicle further has: a required torque setter configured to set a required torque for driving; an output limit setter configured to set an output limit that is a maximum allowable power output from the secondary battery according to a state of the secondary battery; a drive mode setter configured to set a drive mode to one of a motor drive priority mode that gives priority to the motor drive over the hybrid drive and a hybrid drive priority mode that gives priority to the hybrid drive over the motor drive; and a controller configured to control the motor and the generator in a range of the set output limit and control the internal combustion engine at a start-up time in motor drive priority mode when the internal combustion engine is motored and started by the generator in the motor drive priority mode set to the drive mode by the drive mode setter, such that the generator outputs a torque for motoring the internal combustion engine, the motor outputs sum of the set required torque and a torque of cancelling out a torque output from the generator and applied to the driveshaft, and the internal combustion engine is started with increased fuel supply, compared with a start-up time in hybrid drive priority mode when the internal combustion engine is motored and started by the generator in the hybrid drive priority mode set to the drive mode by the drive mode setter.

In the first hybrid vehicle of the invention, at the start-up time in motor drive priority mode when the internal combustion engine is motored and started by the generator during drive in the motor drive priority mode, the motor and the generator are controlled in the range of the output limit that is set as the maximum allowable power output from the secondary battery according to the state of the secondary battery, such that the generator output the torque for motoring the internal combustion engine and the motor outputs the sum of the required torque for driving and the torque of cancelling out the torque output from the generator and applied to the drive shaft. The internal combustion engine is controlled, such that the internal combustion engine is started with the increased fuel supply, compared with the start-up time in hybrid drive priority mode when the internal combustion engine is motored and started by the generator during drive in the hybrid drive priority mode. This raises the possibility that the first igniting state is achieved within a predetermined number of ignitions (for example, once or twice) at the start-up time in motor drive priority mode, compared with the possibility at the start-up time in hybrid drive priority mode. In other words, this decreases the number of ignitions (reduces the time) from the first ignition to the first igniting state as the average of a plurality of starts of the internal combustion engine. As a result, this enables the shock caused by motoring the internal combustion engine to be at least partly overlapped with the shock by starting application of the torque of increasing the rotational speed of the internal combustion engine to the planetary gear mechanism in the first igniting state, thereby preventing the driver from separately feeling shocks a plurality of different times.

In the first hybrid vehicle of the invention, the controller may control the internal combustion engine to be started with advanced ignition timing at the start-up time in motor drive priority mode, compared with at the start-up time in hybrid drive priority mode. This further advances the timing to the first igniting state.

According to another aspect, the present invention is directed to a hybrid vehicle including: an internal combustion engine; a generator having power input and output capabilities; a planetary gear mechanism having three rotational elements respectively connected with three shafts, i.e., a driveshaft linked with an axle, an output shaft of the internal combustion engine and a rotating shaft of the generator; a motor having power input and output capabilities from and to the driveshaft; and a secondary battery having electric power transmission capability to and from the generator and the motor, the hybrid vehicle enabling a hybrid drive with both power output from the internal combustion engine and power input from and output to the motor and a motor drive with only the power input from and output to the motor. The hybrid vehicle further has: a required torque setter configured to set a required torque for driving; an output limit setter configured to set an output limit that is a maximum allowable power output from the secondary battery according to a state of the secondary battery; a drive mode setter configured to set a drive mode to one of a motor drive priority mode that gives priority to the motor drive over the hybrid drive and a hybrid drive priority mode that gives priority to the hybrid drive over the motor drive; and a controller configured to control the motor and the generator in a range of the set output limit and control the internal combustion engine at a start-up time in motor drive priority mode when the internal combustion engine is motored and started by the generator in the motor drive priority mode set to the drive mode by the drive mode setter, such that the generator outputs a torque for motoring the internal combustion engine, the motor outputs sum of the set required torque and a torque of cancelling out a torque output from the generator and applied to the driveshaft, and the internal combustion engine is started with advanced ignition timing, compared with a start-up time in hybrid drive priority mode when the internal combustion engine is motored and started by the generator in the hybrid drive priority mode set to the drive mode by the drive mode setter.

In the second hybrid vehicle of the invention, at the start-up time in motor drive priority mode when the internal combustion engine is motored and started by the generator during drive in the motor drive priority mode, the motor and the generator are controlled in the range of the output limit that is set as the maximum allowable power output from the secondary battery according to the state of the secondary battery, such that the generator output the torque for motoring the internal combustion engine and the motor outputs the sum of the required torque for driving and the torque of cancelling out the torque output from the generator and applied to the drive shaft. The internal combustion engine is controlled, such that the internal combustion engine is started with the advanced ignition timing, compared with the start-up time in hybrid drive priority mode when the internal combustion engine is motored and started by the generator during drive in the hybrid drive priority mode. This advances the timing to the first igniting state. As a result, this enables the shock caused by motoring the internal combustion engine to be at least partly overlapped with the shock by starting application of the torque of increasing the rotational speed of the internal combustion engine to the planetary gear mechanism in the first igniting state, thereby preventing the driver from separately feeling shocks a plurality of different times.

In the first or the second hybrid vehicle of the invention, during the motor drive in the motor drive priority mode set to the drive mode by the drive mode setter, when a drive power which the vehicle is required to output for driving exceeds an output limit-equivalent power that is a power equivalent to the output limit of the secondary battery, the controller controls the internal combustion engine to be motored and started by the generator, and during the motor drive in the hybrid drive priority mode set to the drive mode by the drive mode setter, when a required engine power to be output from the internal combustion engine exceeds a threshold power that is specified as a smaller value than a lower limit of the output limit-equivalent power in the motor drive priority mode set to the drive mode by the drive mode setter, the controller controls the internal combustion engine to be motored and started by the generator.

In the first or the second hybrid vehicle of the invention, the controller may control the internal combustion engine at the start-up time in motor drive priority mode to start fuel injection and ignition while the rotational speed of the internal combustion engine is increased by motoring of the internal combustion engine by the generator.

The first or the second hybrid vehicle of the invention, further includes a charger connected to an external power source during a system stop and operated to charge the secondary battery with electric power from the external power source; and a state-of-charge calculator configured to calculate a state-of-charge of the secondary battery to an entire capacity of power storage according to the state of the secondary battery, wherein when the state of charge calculated at a system start-up time is equal to or greater than a predetermined first rate, the drive mode setter sets the drive mode to the motor drive priority mode until the calculated state of charge decreases below a predetermined second rate that is smaller than the predetermined first rate, and unless the drive mode is set to the motor drive priority mode, the drive mode setter sets the drive mode to the hybrid drive priority mode.

BRIEF DESCRIPTION OF THE DRAWINGS

FIG. 13 is a diagram schematically illustrating time changes of rotational speed Ne of the engine 22, amount of fuel injection Qf, ignition timing Tf and carrier torque Tc as the torque applied to a carrier 34 of the power distribution-integration mechanism 30 when the engine 22 is started during drive in a motor drive priority mode and in a hybrid drive priority mode.

MODES FOR CARRYING OUT THE INVENTION

The following describes aspects of the invention with reference to embodiments.

Figure 1:
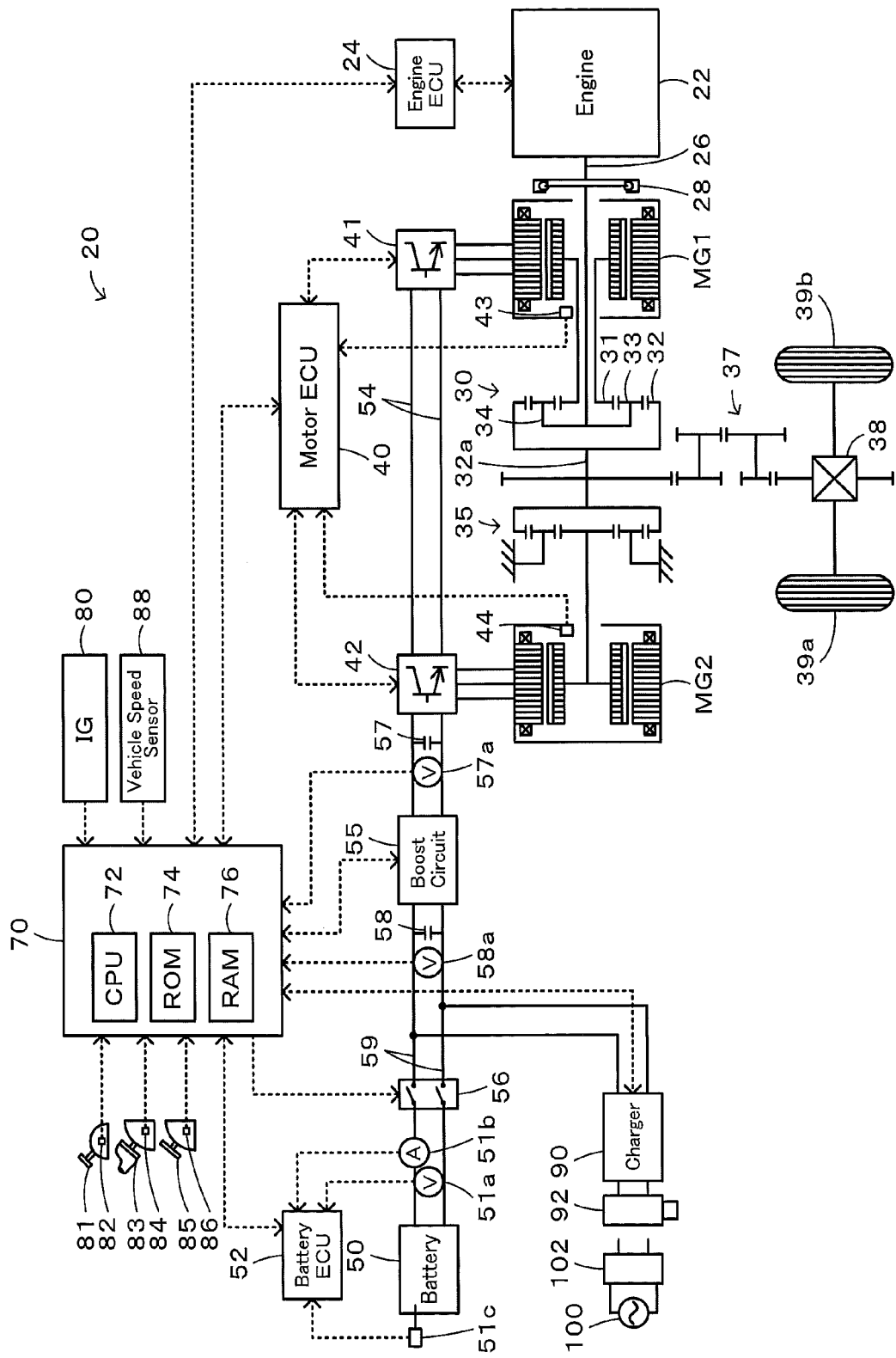
FIG. 1 is a configuration diagram schematically illustrating the configuration of a hybrid vehicle 20 according to one embodiment of the invention.

FIG. 1 is a configuration diagram schematically illustrating the configuration of a hybrid vehicle 20 according to one embodiment of the invention. As illustrated, the hybrid vehicle 20 of the embodiment includes: an engine 22 provided as an internal combustion engine that consumes a hydrocarbon fuel such as gasoline or light oil to output power; a three shaft-type power distribution-integration mechanism 30 provided as a planetary gear mechanism where a carrier 34 linked with a plurality of pinion gears 33 is connected via a damper 28 with a crankshaft 26 or an output shaft of the engine 22 and a ring gear 32 is connected with a ring gear shaft 32a or a driveshaft linked with drive wheels 39a and 39b via a gear mechanism 37 and a differential gear 38; a motor MG1 provided as, for example, a known synchronous motor-generator that has a rotor connected with a sun gear 31 of the power distribution-integration mechanism 30; a motor MG2 provided as, for example, a known synchronous motor-generator that has a rotor connected via a reduction gear 35 with the ring gear shaft 32a or the driveshaft; inverters 41 and 42 operated to drive the motors MG1 and MG2; a battery 50 provided as, for example, a lithium ion secondary battery; a boost circuit 55 provided as a known boost converter that boosts the power from the battery 50 and supplies the boosted power to the inverters 41 and 42; a system main relay 56 serving to enable connection and disconnection between the battery 50 and the boost circuit 55; a charger 90 attached to a low-voltage system power line 59 located on the system main relay 56-side of the boost circuit 55 to convert the AC power from an external power source 100 to DC power and charge the battery 50; and a hybrid electronic control unit 70 serving to control the entire vehicle.

Figure 2:
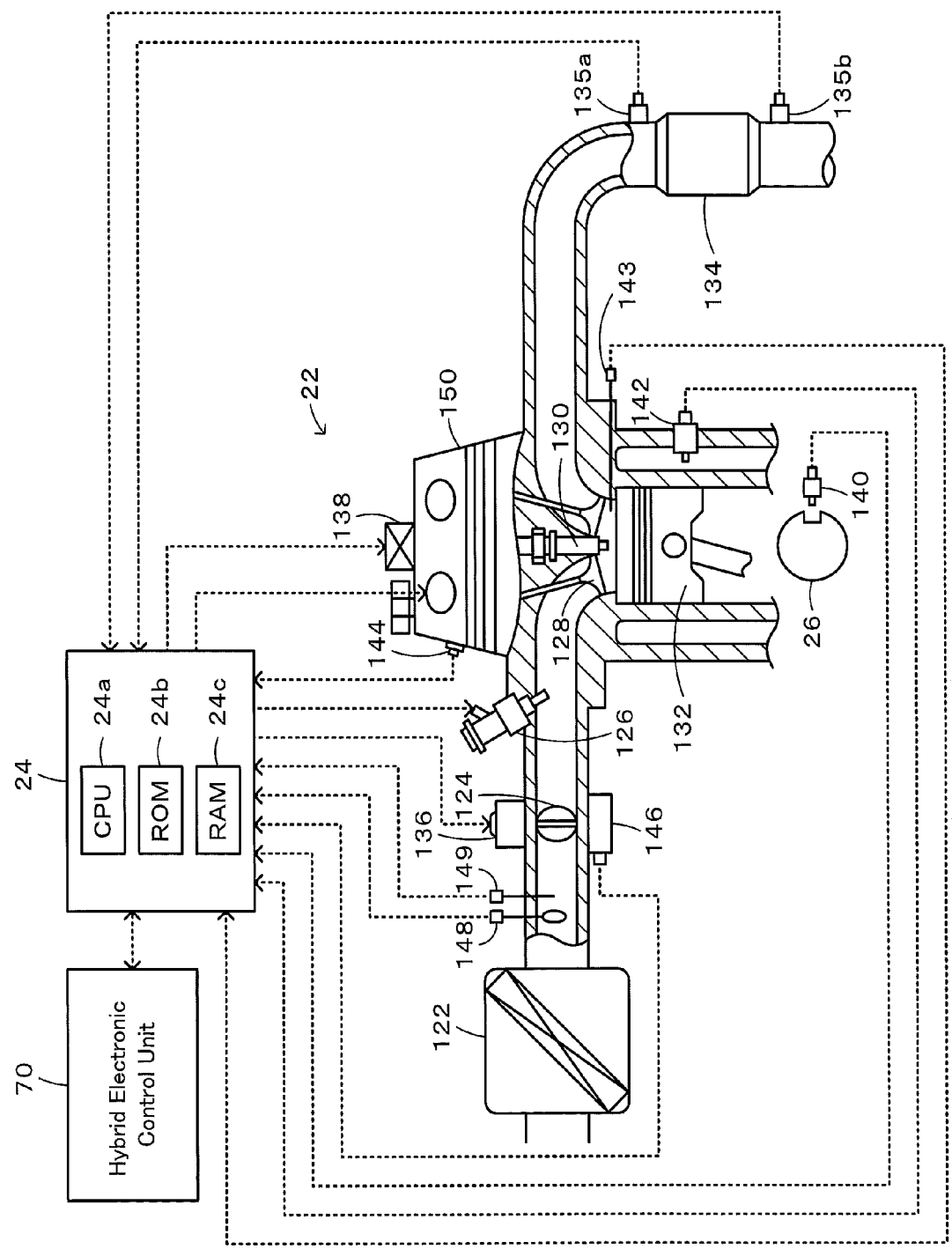
FIG. 2 is a configuration diagram schematically illustrating the structure of an engine 22.

As illustrated in FIG. 2, in the engine 22, the air purified by an air cleaner 122 and taken in via a throttle valve 124 is mixed with gasoline injected from a fuel injection valve 126, and the air-fuel mixture is introduced into a combustion chamber via an air intake valve 128 and is explosively combusted by an electric spark formed by a spark plug 130. The reciprocating motion of a piston 132 pressed down by the energy of the explosive combustion is converted to rotating motion of the crankshaft 26. The emission from the engine 22 goes through a catalytic converter (three-way catalyst) 134 that converts harmful components, such as carbon monoxide (CO), hydrocarbons (HC) and nitrogen oxides (NOx) and is discharged to the outside air.

The engine 22 is controlled by an engine electronic control unit (hereinafter referred to as engine ECU) 24. The engine ECU 24 is provided as a microprocessor including a CPU 24a, a ROM 24b serving to store processing programs, a RAM 24c serving to temporarily store data, input and output ports (not shown) and a communication port (not shown). The engine ECU 24 receives, via its input port, signals from various sensors that detect the conditions of the engine 22: for example, a crank position θcr from a crank position sensor 140 serving to detect the rotational position of the crankshaft 26; a cooling water temperature Tw from a water temperature sensor 142 serving to detect the temperature of cooling water for the engine 22; an in-cylinder pressure Pin from a pressure sensor 143 placed in the combustion chamber; a cam position θca from a cam position sensor 144 serving to detect the rotational position of a camshaft driven to open and close the air intake valve 128 and an exhaust valve operated for air intake and exhaust to and from the combustion chamber; a throttle position from a throttle valve positions sensor 146 serving to the position of the throttle valve 124; an amount of intake air Qa from an air flow meter 148 attached to an air intake pipe; an intake air temperature from a temperature sensor 149 also attached to the air intake pipe; an air-fuel ratio from an air-fuel ratio sensor 135a; and an oxygen signal from an oxygen sensor 135b. The engine ECU 24 outputs, via its output port, various control signals for operating the engine 22: for example, a drive signal to the fuel injection valve 126; a drive signal to a throttle motor 136 serving to adjust the position of the throttle valve 124; a control signal to an ignition coil 138 integrated with an igniter; and a control signal to a variable valve timing mechanism 150 serving to vary the open and close timings of the air intake valve 128. The engine ECU 24 communicates with the hybrid electronic control unit 70 to operate and control the engine 22 in response to control signals from the hybrid electronic control unit 70 and output data regarding the operating conditions of the engine 22 as needed basis. The engine ECU 24 also serves to calculate the rotational speed of the crankshaft 26, i.e., rotational speed Ne of the engine 22, based on the crank position from the crank position sensor 140.

The motors MG1 and MG2 are both driven and controlled by a motor electronic control unit (hereinafter referred to as motor ECU) 40. The motor ECU 40 receives signals required for driving and controlling the motors MG1 and MG2: for example, signals from rotational position detection sensors 43 and 44 serving to detect the rotational positions of respective rotors of the motors MG1 and MG2; and phase currents applied to the motors MG1 and MG2 and detected by current sensors (not shown), while outputting switching control signals to the inverters 41 and 42. The motor ECU 40 communicates with the hybrid electronic control unit 70 to drive and control the motors MG1 and MG2 in response to control signals from the hybrid electronic control unit 70 and output data regarding the operating conditions of the motors MG1 and MG2 to the hybrid electronic control unit 70 as needed basis. The motor ECU 40 also serves to calculate rotational speeds Nm1 and Nm2 of the motors MG1 and MG2 based on the signals from the rotational position detection sensors 43 and 44.

Figure 3:
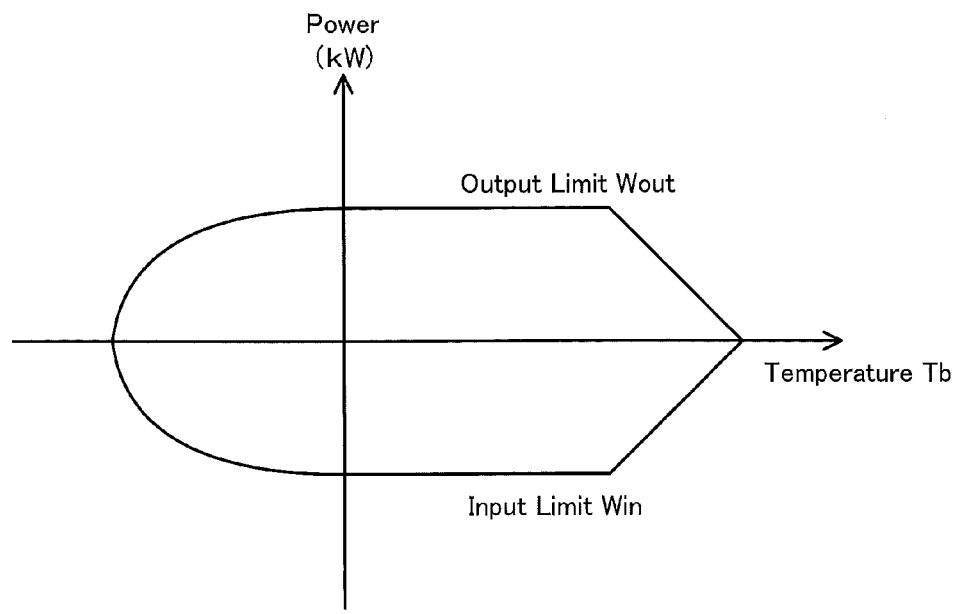
FIG. 3 illustrates one example of the relationship between input and output limits Win and Wout and battery temperature Tb.
Figure 4:
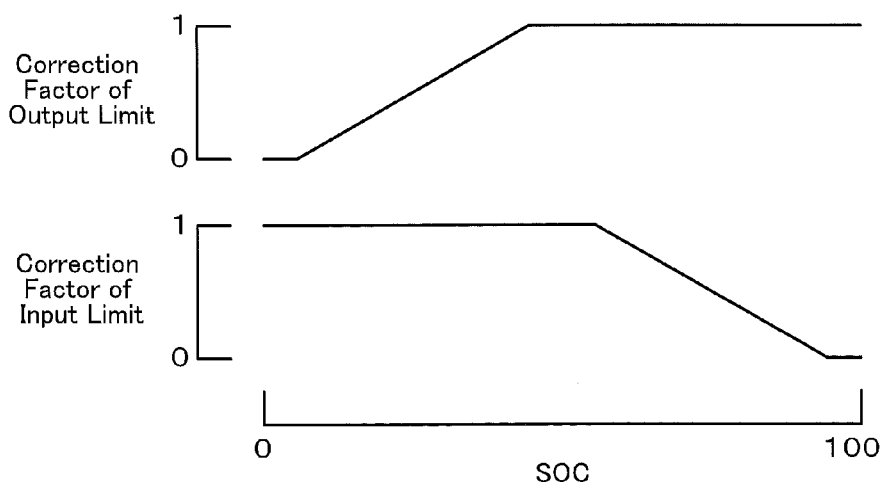
FIG. 4 illustrates one example of the relationship between correction factors of the input and output limits Win and Wout and state of charge SOC of a battery 50.

The battery 50 is controlled by a battery electronic control unit (hereinafter referred to as battery ECU) 52. The battery ECU 52 receives signals required for managing the battery 50: for example, an inter-terminal voltage Vb from a voltage sensor 51a placed between terminals of the battery 50; a charge-discharge current Ib from a current sensor 51b attached to an output terminal on the positive electrode of the battery 50; and a battery temperature Tb from a temperature sensor 51c attached to the battery 50, while outputting data regarding the conditions of the battery 50 to the hybrid electronic control unit 70 by communication as needed basis. For the purpose of management of the battery 50, the battery ECU 52 also serves to calculate a state of charge SOC or a ratio of power stored in the battery 50 to the entire capacity of power storage (storage capacity) based on the integrated value of charge-discharge current Ib detected by the current sensor 51b and calculate input and output limits Win and Wout as maximum allowable powers to charge and discharge the battery 50 based on the calculated state of charge SOC and the battery temperature Tb. The input and output limits Win and Wout of the battery 50 may be set by specifying base values of the input and output limits Win and Wout based on the battery temperature Tb, specifying an input limit correction factor and an output limit correction factor based on the state of charge SOC of the battery 50 and multiplying the specified base values of the input and output limits Win and Wout by the corresponding correction factors. FIG. 3 illustrates one example of the relationship between the input and output limits Win and Wout and the battery temperature Tb. FIG. 4 illustrates one example of the relationship between the correction factors of the input and output limits Win and Wout and the state of charge SOC of the battery 50.

The charger 90 serves to charge the battery 50 with the power from the external power source 100 by connecting a vehicle-side connector 92 to an external power source-side connector 102 of the external power source 100. Although not being specifically illustrated, the charger 90 includes: a charging relay serving to enable connection and disconnection between the low-voltage system power line 59 and the vehicle-side connector 92; an AC-DC converter serving to convert the AC power from the external power source 100 to DC power; and a DC-DC converter serving to convert the voltage of the DC power converted by the AC-DC converter and supply the converted voltage to the low-voltage system power line 59.

The hybrid electronic control unit 70 is provided as a microprocessor including a CPU 72, a ROM 74 serving to store processing programs, a RAM 76 serving to temporarily store data, input and output ports (not shown) and a communication port (not shown). The hybrid electronic control unit 70 receives, via its input port, a voltage VH (high-voltage system voltage) from a voltage sensor 57a placed between terminals of a capacitor 57 attached to a high-voltage system power line 54 on the inverters 41 and 42-side of the boost circuit 55; a voltage VL (low voltage system voltage) from a voltage sensor 58a placed between terminals of a capacitor 58 attached to the low-voltage system power line 59, an ignition signal from an ignition switch 80; a gearshift position SP from a gearshift position sensor 82 serving to detect the operational position of a gearshift lever 81; an accelerator opening Acc from an accelerator pedal position sensor 84 serving to detect the depression amount of an accelerator pedal 83; a brake pedal position BP from a brake pedal position sensor 86 serving to detect the depression amount of a brake pedal 85; and a vehicle speed V from a vehicle speed sensor 88. The hybrid electronic control unit 70 outputs a switching control signal to switching elements of the boost circuit 55, a drive signal to the system main relay 56, and a control signal to the charger 90 via its output port. As described above, the hybrid electronic control unit 70 is connected with the engine ECU 24, the motor ECU 40 and the battery ECU 52 via the communication ports to transmit various control signals and data to and from the engine ECU 24, the motor ECU 40 and the battery ECU 52.

The hybrid vehicle 20 of the embodiment having the above configuration calculates a required torque to be output to the ring gear shaft 32a or the driveshaft based on the vehicle speed V and the accelerator opening Acc corresponding to the driver's depression amount of the accelerator pedal 83 and operates and controls the engine 22 and the motors MG1 and MG2 in order to output a required power corresponding to the calculated required torque to the ring gear shaft 32a. The operation control of the engine 22 and the motors MG1 and MG2 includes a torque conversion drive mode, a charge-discharge drive mode and a motor drive mode. In the torque conversion drive mode, the engine 22 is operated and controlled to output power, which is equivalent to the required power, from the engine 22, while the motors MG1 and MG2 are driven and controlled to convert the entire power output from the engine 22 by torque conversion by the power distribution-integration mechanism 30 and the motors MG1 and MG2 and output the converted power to the ring gear shaft 32a. In the charge-discharge drive mode, the engine 22 is operated and controlled to output power, which is equivalent to the sum of the required power and electric power required for charging or discharging the battery 50, from the engine 22, while the motors MG1 and MG2 are driven and controlled to convert the entire power or part of the power output from the engine 22 by torque conversion by the power distribution-integration mechanism 30 and the motors MG1 and MG2 and output the required power to the ring gear shaft 32a accompanied with charge or discharge of the battery 50. In the motor drive mode, the engine 22 stops operation, while the motor MG2 is driven and controlled to output power, which is equivalent to the required power, to the ring gear shaft 32a. The torque conversion drive mode and the charge-discharge drive mode control the engine 22 and the motors MG1 and MG2 to output the required power to the ring gear shaft 32a accompanied with operation of the engine 22 and may thus be hereinafter collectively called engine drive mode.

Figure 5:
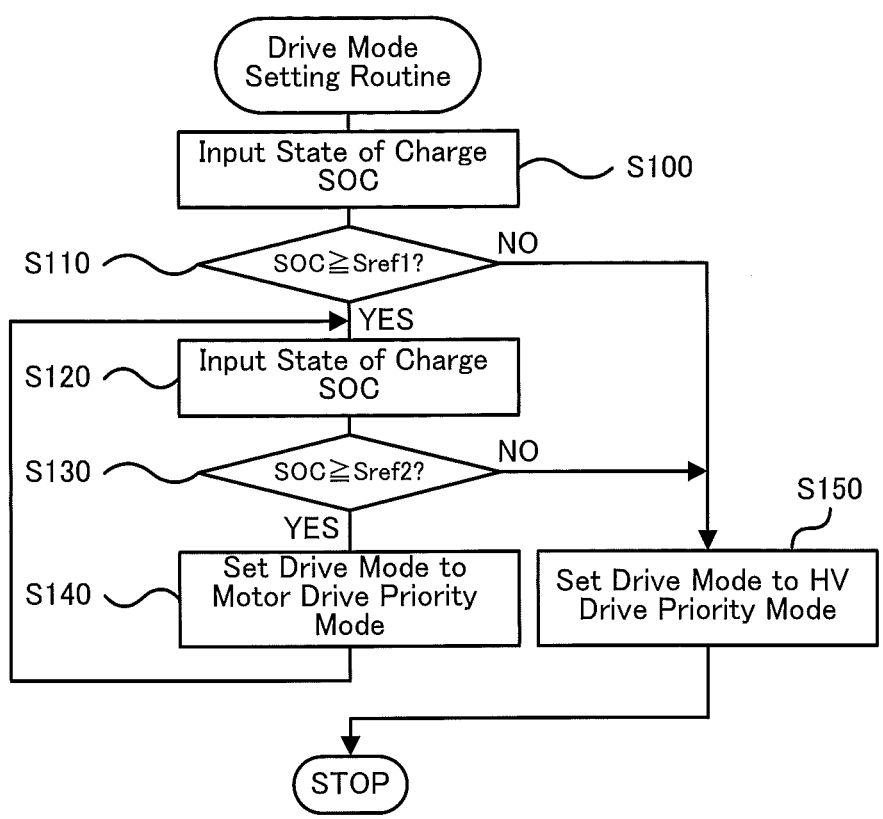
FIG. 5 is a flowchart showing an example flow of drive mode setting routine executed by a hybrid electronic control unit 70.

The hybrid vehicle 20 of the embodiment controls charge-discharge of the battery 50 during drive to decrease the state of charge SOC of the battery 50 to a certain level that is sufficient for a start of the engine 22 when reaching home or predetermined charge point. After a system stop of the vehicle at home or predetermined charge point, the vehicle-side connector 92 of the charger 90 is connected to the external power source-side connector 102 of the external power source 100, and the DC-DC converter and the AC-DC converter (not shown) of the charger 90 are controlled to charge the battery 50 with the power from the external power source 100 to a full charge level or to a specified charge level lower than the full charge level. On a system start-up after charging the battery 50, a drive mode setting routine illustrated in FIG. 5 is triggered. When the state of charge SOC of the battery 50 at the system start-up is equal to or greater than a threshold value Sref1 (for example, 40% or 50%) that is set as the state of charge SOC allowing for some extent of driving in the motor drive mode (motor drive) (steps S100 and S110), the vehicle is driven with setting the drive mode to the motor drive priority mode that gives priority to the motor drive over the drive in the engine drive mode (hybrid drive) until the state of charge SOC of the battery 50 decreases below a threshold value Sref2 (for example, 20% or 30%) that is set to a level allowing for a start of the engine 22 (steps S120 to S140). When the state of charge SOC of the battery 50 is less than the threshold value Sref1 at the system start-up or when the state of charge SOC of the battery 50 is equal to or greater than the threshold value Sref1 at the system start-up and subsequently decreases below the threshold value Sref2 (steps S100 to S130), on the other hand, the vehicle is driven with setting the drive mode to the hybrid drive priority mode that gives priority to the hybrid drive over the motor drive (step S150).

Figure 6:
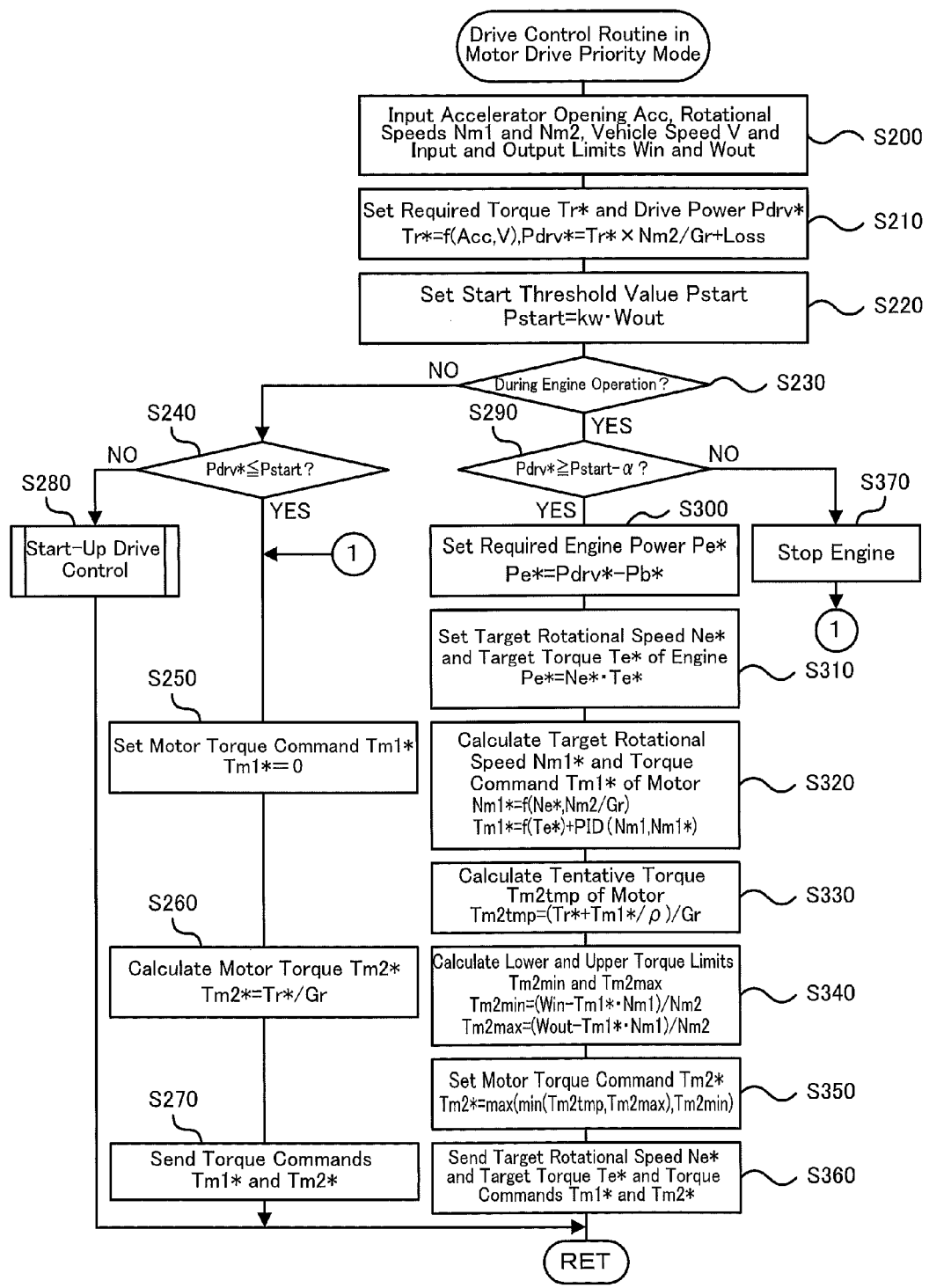
FIG. 6 is a flowchart showing an example flow of drive control routine in motor drive priority mode executed by the hybrid electronic control unit 70.
Figure 7:
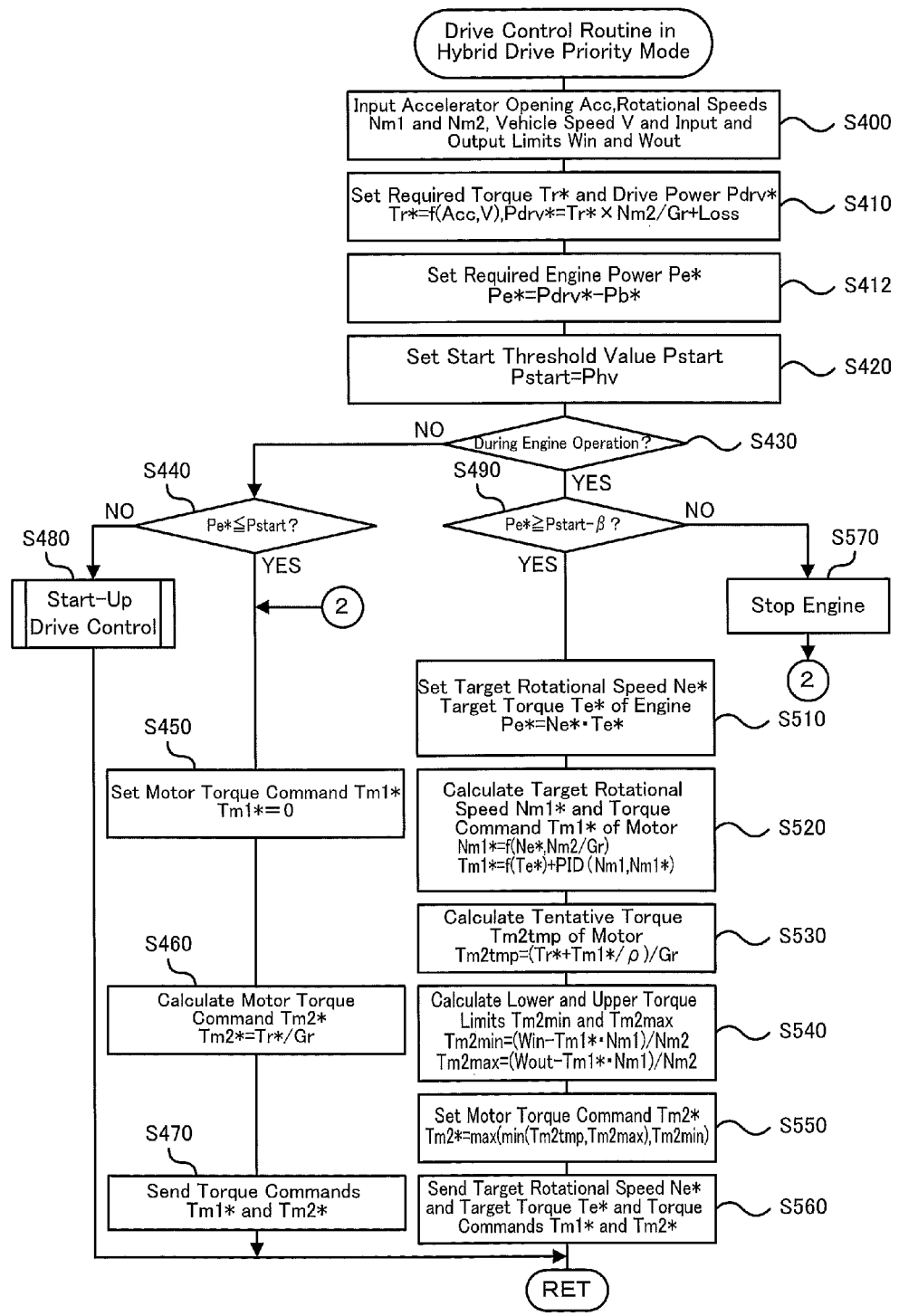
FIG. 7 is a flowchart showing an example flow of drive control routine in hybrid drive priority mode executed by the hybrid electronic control unit 70.
Figure 8:
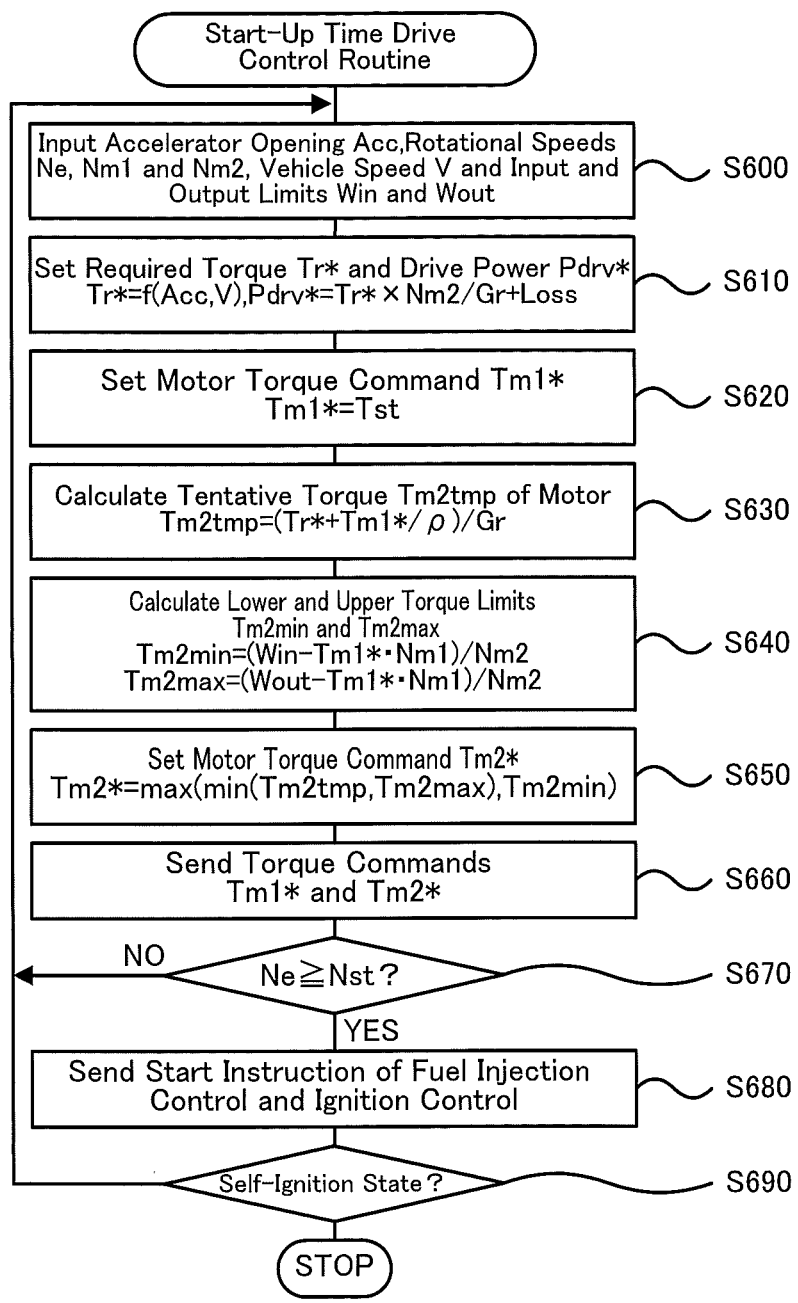
FIG. 8 is a flowchart showing an example flow of start-up drive control routine executed by the hybrid electronic control unit 70.

The following describes the operations of the hybrid vehicle 20 of the embodiment or more specifically the operations for motoring and starting the engine 22 by the motor MG1 during drive in a motor drive priority mode or in a hybrid drive priority mode. The description first regards drive control during drive in the motor drive priority mode and drive control during drive in the hybrid drive priority mode as the premise and subsequently regards drive control for motoring and starting the engine 22 by the motor MG1 during drive in either of these modes. FIG. 6 is a flowchart showing an example flow of drive control routine in motor drive priority mode executed by the hybrid electronic control unit 70 when the drive mode is set to the motor drive priority mode. FIG. 7 is a flowchart showing an example flow of drive control routine in hybrid drive priority mode executed by the hybrid electronic control unit 70 when the drive mode is set to the hybrid drive priority mode. FIG. 8 is a flowchart showing an example flow of start-up drive control routine executed by the hybrid electronic control unit 70 at a start of the engine 22. The routines of FIGS. 6 and 7 are repeatedly performed at predetermined time intervals (for example, at several msec) except at a start of the engine 22.

When the drive control routine in motor drive priority mode of FIG. 6 is triggered, the CPU 72 of the hybrid electronic control unit 70 first inputs data required for control, e.g., the accelerator opening Acc from the accelerator pedal position sensor 84, the vehicle speed V from the vehicle speed sensor 88, the rotational speeds Nm1 and Nm2 of the motors MG1 and MG2 and the input and output limits Win and Wout of the battery 50 (step S200). The rotational speeds Nm1 and Nm2 of the motors MG1 and MG2 may be calculated based on the rotational positions of the rotors of the motors MG1 and MG2 detected by the rotational position detection sensors 43 and 44 and input from the motor ECU 40 by communication. The input and output limits Win and Wout of the battery 50 may be set based on the battery temperature Tb and the state of charge SOC of the battery 50 and input from the battery ECU 52 by communication.

Figure 9:
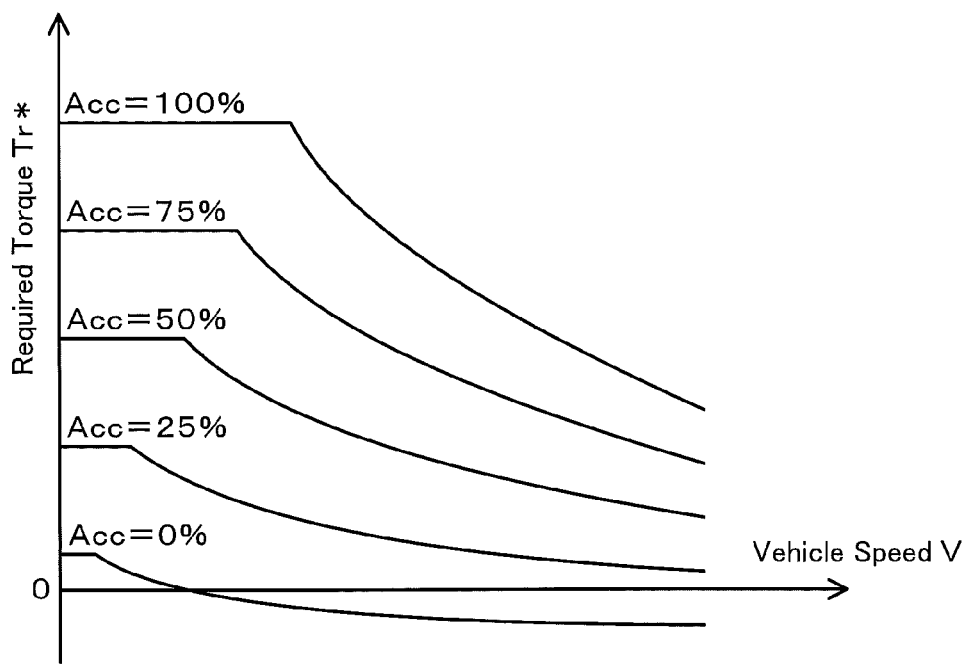
FIG. 9 is a diagram illustrating one example of a required torque setting map.

After the data input, the CPU 72 sets a required torque Tr* to be output to the ring gear shaft 32a or the driveshaft linked with the drive wheels 39a and 39b as the torque required for the vehicle and a drive power Pdrv* which the vehicle is required to output for driving, based on the input accelerator opening Acc and vehicle speed V (step S210), and sets an output limit-equivalent power (kw·Wout), which is obtained by multiplying the output limit Wout of the battery 50 by a conversion factor kw for converting electric power to the driving system power, to a threshold value Pstart for starting the engine 22 (step S220). According to the embodiment, the required torque Tr* may be set by storing specified relationships between the accelerator opening Acc, the vehicle speed V and the required torque Tr* as a required torque setting map in the ROM 74 and reading the required torque Tr* corresponding to the given accelerator opening Acc and vehicle speed V from the stored map. FIG. 9 illustrates one example of the required torque setting map. The drive power Pdrv* may be calculated as the sum of the product of the set required torque Tr* and a rotational speed Nr of the ring gear shaft 32a and a potential loss Loss. The rotational speed Nr of the ring gear shaft 32a may be obtained by multiplying the vehicle speed V by a conversion factor k (Nr=k·V) or may be obtained by dividing the rotational speed Nm2 of the motor MG2 by a gear ratio Gr of the reduction gear 35 (Nr=Nm2/Gr).

The CPU 72 subsequently determines whether the engine 22 is during operation or during operation stop (step S230). When the engine 22 is during operation stop, the CPU 72 determines whether the set drive power Pdrv* is equal to or less than the threshold value Pstart (step S240). When the drive power Pdrv* is equal to or less than the threshold value Pstart, the CPU 72 determines that the motor drive is continuable and thereby sets a value 0 to a torque command Tm1* of the motor MG1 (step S250), sets the result of division of the required torque Tr* by the gear ratio Gr of the reduction gear 35 to a torque command Tm2* of the motor MG2 (step S260), sends the set torque commands Tm1* and Tm2* to the motor ECU 40 (step S270) and terminates this drive control routine. The motor ECU 40 receives the torque commands Tm1* and Tm2* and performs switching control of the switching elements of the inverters 41 and 42 to drive the motor MG1 with the torque command Tm1* and drive the motor MG2 with the torque command Tm2*. Such control enables the vehicle to be driven with output of the required torque Tr* from the motor MG2 to the ring gear shaft 32a or the driveshaft.

When it is determined that the drive power Pdrv* is greater than the threshold value Pstart at step S240, the CPU 72 determines that the engine 22 is required to start and performs the start-up drive control routine of FIG. 8 for motoring and starting the engine 22 by the motor MG1 during drive (step S280).

After completion of starting the engine 22, it is determined that the engine 22 is during operation at step S230. The CPU 72 then compares the drive power Pdrv* with a value obtained by subtracting a predetermined power α as margin from the threshold value Pstart (step S290). The predetermined power α provides hysteresis to prevent frequent starts and stops of the engine 22 when the drive power Pdrv* is close to the threshold value Pstart, and may be set arbitrarily.

Figure 10:
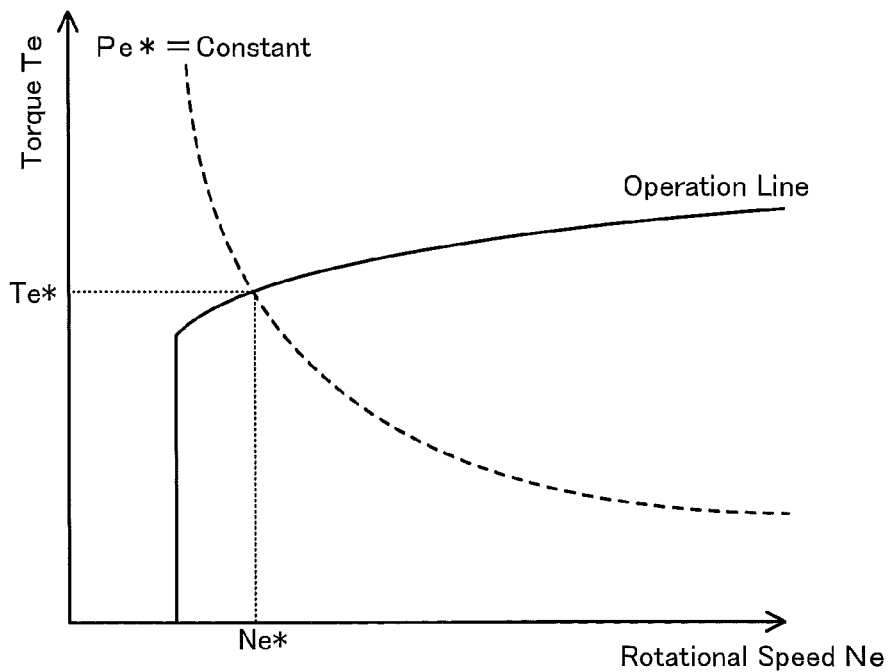
FIG. 10 is a diagram illustrating one example of an operation line of the engine 22 and a method of setting a target rotational speed Ne* and a target torque Te*.

When the drive power Pdrv* is equal to or greater than the value obtained by subtracting the predetermined power α from the threshold value Pstart, the CPU 72 determines that the operation of the engine 22 is to be continued and thereby sets a value, which is obtained by subtracting a required charge-discharge power Pb* to charge or discharge the battery 50 (providing a positive value during discharge of the battery 50) from the drive power Pdrv*, to a required engine power Pe* to be output from the engine 22 (step S300) and sets a target rotational speed Ne* and a target torque Te* as an operation point at which the engine 22 is to be operated, based on the set required engine power Pe* and an operation line for efficiently operating the engine 22 (step S310). The required charge-discharge power Pb* is set to a value 0 when the state of charge SOC of the battery 50 is in a target management range (for example, range of plus and minus 5% or 10%) about a start request-time state of charge SOCst as the state of charge SOC at a start request of the engine 22, is set to a positive value for discharging when the state of charge SOC of the battery 50 is greater than the upper limit of the target management range, and is set to a negative value for charging when the state of charge SOC of the battery 50 is less than the lower limit of the target management range. FIG. 10 illustrates one example of the operation line of the engine 22 and the method of setting the target rotational speed Ne* and the target torque Te*. As illustrated, the target rotational speed Ne* and the target torque Te* may be determined as the intersection of the operation line and a curve of constant required engine power Pe* (Ne*×Te*).

Figure 11:
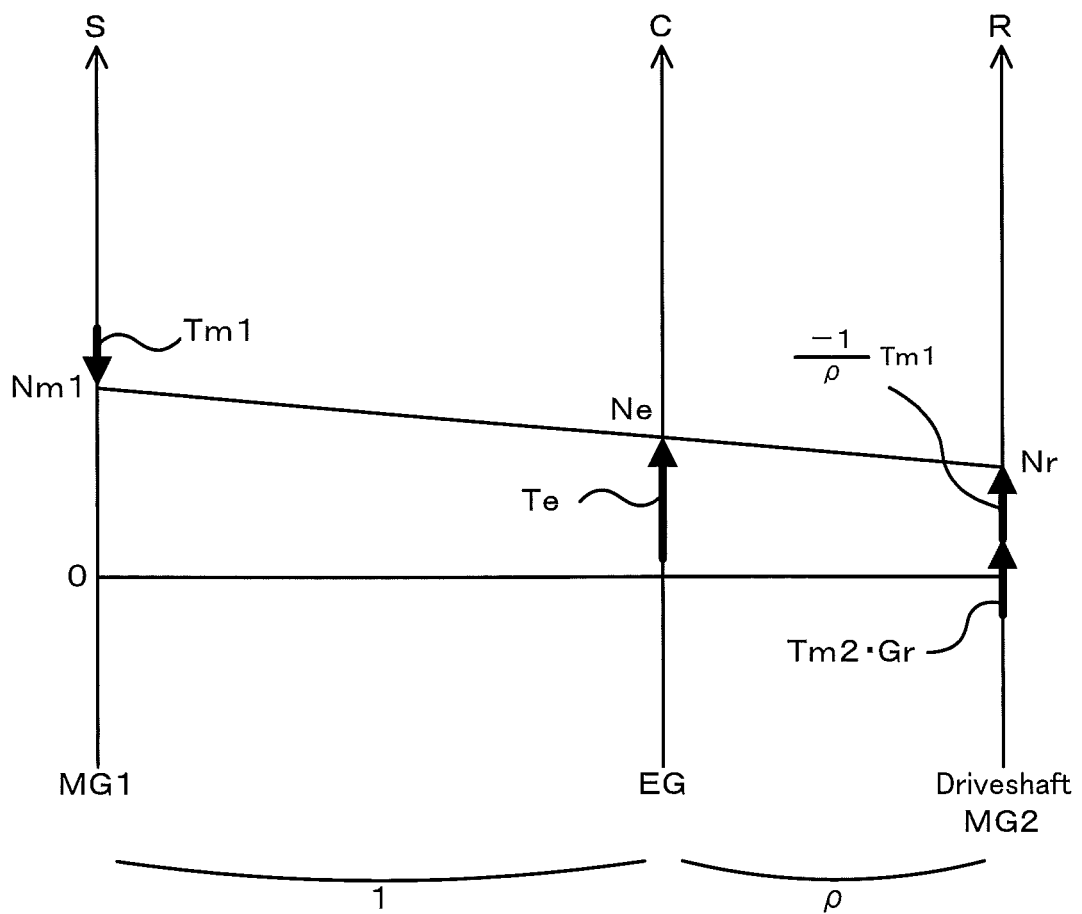
FIG. 11 is a diagram illustrating one example of a collinear graph showing the dynamic relationship between the rotational speed and the torque with respect to rotational elements of a power distribution-integration mechanism 30 when the vehicle is driven with outputting power from the engine 22.

The CPU 72 subsequently calculates a target rotational speed Nm1* of the motor MG1 from the target rotational speed Ne* of the engine 22, the rotational speed Nm2 of the motor MG2 and a gear ratio (number of teeth of sun gear/number of teeth of ring gear) ρ of the power distribution-integration mechanism 30 according to Equation (1) given below, and calculates a torque command Tm1* of the motor MG1 from the calculated target rotational speed Nm1* and the input rotational speed Nm1 of the motor MG1 according to Equation (2) given below (step S320). Equation (1) is a dynamic relational expression with respect to the rotational elements of the power distribution-integration mechanism 30. FIG. 11 illustrates one example of a collinear graph showing the dynamic relationship between the rotational speed and the torque with respect to the rotational elements of the power distribution-integration mechanism 30 when the vehicle is driven with outputting power from the engine 22. An S-axis on the left shows the rotational speed of the sun gear 31 that is equal to the rotational speed Nm1 of the motor MG1. A C-axis shows the rotational speed of the carrier 34 that is equal to the rotational speed Ne of the engine 22. An R-axis shows the rotational speed Nr of the ring gear 32 that is equal to division of the rotational speed Nm2 of the motor MG2 by the gear ratio Gr of the reduction gear 35. The two thick-line arrows on the R-axis represent a torque applied to the ring gear shaft 32a when the torque Tm1 is output from the motor MG1 and a torque applied to the ring gear shaft 32a via the reduction gear 35 when the torque Tm2 is output from the motor MG2. Equation (1) is readily introduced from the collinear graph. Equation (2) is a relational expression in feedback control to rotate the motor MG1 at the target rotational speed Nm1*, wherein "k1" in the second term on the right side represents a gain of a proportional and "k2" in the third term on the right side represents a gain of an integral term.

$$Nm1^* = Ne^* \cdot (1+\rho)/\rho - Nm2/(Gr \cdot \rho) \tag{1}$$

$$Tm1^* = -\rho \cdot Te^*/(1+\rho) + k1 \cdot (Nm1^* - Nm1) + k2 \cdot \int (Nm1^* - Nm1) dt \tag{2}$$

The CPU 72 then calculates a tentative torque Tm2 tmp as a tentative value of torque to be output from the motor MG2 according to Equation (3) given below, which adds the result of division of the torque command Tm1* of the motor MG1 by the gear ratio ρ of the power distribution-integration mechanism 30 to the required torque Tr* and then divides the sum by the gear ratio Gr of the reduction gear 35 (step S330). The CPU 72 also calculates lower and upper torque limits Tm2 min and Tm2 max as minimum and maximum torques allowed to output from the motor MG2 according to Equations (4) and (5) given below, which respectively subtract consumed power (generated power) of the motor MG1 obtained by multiplying the set torque command Tm1* by the current rotational speed Nm1 of the motor MG1 from the input limit Win or the output limit Wout of the battery 50 and then divide the result of the subtraction by the rotational speed Nm2 of the motor MG2 (step S340). The CPU 72 also restricts the calculated tentative torque Tm2 tmp with the lower and upper torque limits Tm2 min and Tm2 max according to Equation (6) given below to set a torque command Tm2* of the motor MG2 (step S350). The CPU 72 sends the target rotational speed Ne* and the target torque Te* of the engine 22 to the engine ECU 24 and the torque commands Tm1* and Tm2* of the motors MG1 and MG2 to the motor ECU 40 (step S360) and terminates this drive control routine. Equation (3) is readily introduced from the collinear graph of FIG. 11. The engine ECU 24 receives the target rotational speed Ne* and the target torque Te* and performs various controls of the engine 22, such as fuel injection control, ignition control and intake air amount regulation, to operate the engine 22 at an operation point (target operation point) defined by the target rotational speed Ne* and the target torque Te*. The motor ECU 40 receives the torque commands Tm1* and Tm2* and performs switching control of the switching elements of the inverters 41 and 42 to drive the motor MG1 with the torque command Tm1* and drive the motor MG2 with the torque command Tm2*. Such control causes the engine 22 to output the required engine power Pe* and drives the motors MG1 and MG2 within the range of the input and output limits Win and Wout of the battery 50, thus enabling the vehicle to be driven with output of a torque based on the required torque Tr* to the ring gear shaft 32a or the driveshaft.

$$Tm2tmp = (Tr^* + tm1^*/\rho)/Gr \tag{3}$$

$$Tm2\min = (Win - Tm1^* \cdot Nm1)/Nm2 \tag{4}$$

$$Tm2\max = (Wout - Tm1^* \cdot Nm1)/Nm2 \tag{5}$$

$$Tm2^* = \max(\min(Tm2tmp, Tm2\max), Tm2\min) \tag{6}$$

When it is determined that the drive power Pdrv* is less than the value obtained by subtracting the predetermined power α from the threshold value Pstart at step S290, on the other hand, the CPU 72 stops operation of the engine 22 (step S370). The CPU 72 sets the value 0 to the torque command Tm1* of the motor MG1, sets the result of division of the required torque Tr* by the gear ratio Gr of the reduction gear 35 to the torque command Tm2* of the motor MG2 and sends the set torque commands Tm1* and Tm2* to the motor ECU 40 (steps S250 to S270) to enable the motor drive and then terminates the drive control routine.

This drive control routine in motor drive priority mode performed during setting of the motor drive priority mode to the drive mode enables the motor drive when the drive power Pdrv* is equal to or less than the output limit-equivalent power (kw·Wout), while enabling the hybrid drive when the drive power Pdrv* is greater than the output limit-equivalent power (kw·Wout). This decreases the state of charge SOC of the battery 50 until a system stop.

The following describes drive control during drive in the hybrid drive priority mode. When the drive control routine in hybrid drive priority mode of FIG. 7 is triggered, like the processing of steps S200, S210 and S300 in the routine of FIG. 6, the CPU 72 of the hybrid electronic control unit 70 inputs data required for control, e.g., the accelerator opening Acc, the vehicle speed V, the rotational speeds Nm1 and Nm2 of the motors MG1 and MG2 and the input and output limits Win and Wout of the battery 50, sets the required torque Tr* to be output to the ring gear shaft 32a or the driveshaft and the drive power Pdrv* which the vehicle is required to output for driving based on the input accelerator opening Acc and vehicle speed V, and sets the required engine power Pe* (steps S400, S410 and S412). In this case, the required charge-discharge power Pb* used to set the required engine power Pe* is set to a value 0 when the state of charge SOC of the battery 50 is in a target management range (for example, range of plus and minus 5% or 10%) about the threshold value Sref2 (for example, 20% or 30%) as the criterion to detect a shift from the motor drive priority mode to the hybrid drive priority mode or a slightly larger value, is set to a positive value for discharging when the state of charge SOC of the battery 50 is greater than the upper limit of the target management range and is set to a negative value for charging when the state of charge SOC of the battery 50 is less than the lower limit of the target management range.

The CPU 72 subsequently sets an HV priority time-judging power Phv specified in advance as a lower limit of a power range where the engine 22 is operated with high efficiency to a threshold value Pstart for starting the engine 22 (step S420). According to this embodiment, the HV priority time-judging power Phv is set to a smaller value than the lower limit of the output limit-equivalent power (kw·Wout) when the drive mode is set to the motor drive priority mode and the battery temperature Tb is ordinary temperature (for example, 20° C. or 25° C.) (output limit-equivalent power (kw·Wout) when the battery temperature Tb is ordinary temperature and when the state of charge SOC of the battery 50 is equal to the threshold value Sref2, hereinafter called EV priority time-judging lower limit power Pev).

The CPU 72 subsequently determines whether the engine 22 is during operation or during operation stop (step S430). When the engine 22 is during operation stop, the CPU 72 determines whether the set required engine power Pe* is equal to or less than the threshold value Pstart (step S440). When the required engine power Pe* is equal to or less than the threshold value Pstart, the CPU 72 determines that the motor drive is continuable and sets and sends the torque commands Tm1* and Tm2* of the motors MG1 and MG2 to the motor ECU 40 (steps S450 to S470) like the processing of steps S250 to S270 in the routing of FIG. 6 and terminates this drive control routine.

When it is determined that the required engine power Pe* is greater than the threshold value Pstart at step S440, the CPU 72 determines that the engine 22 is required to start and performs the start-up drive control routine of FIG. 8 for motoring and starting the engine 22 by the motor MG1 during drive (step S480).

After completion of starting the engine 22, it is determined that the engine 22 is during operation at step S430. The CPU 72 then compares the required engine power Pe* with a value obtained by subtracting a predetermined power β as margin from the threshold value Pstart (step S490). The predetermined power β provides hysteresis to prevent frequent starts and stops of the engine 22 when the required engine power Pe* is close to the threshold value Pstart, and may be set arbitrarily. The predetermined power β may be equal to the predetermined power a described above. When the required engine power Pe* is equal to or greater than the value obtained by subtracting the predetermined power β from the threshold value Pstart, the CPU 72 determines that the operation of the engine 22 is to be continued and sets and sends the target rotational speed Ne* and the target torque Te* of the engine 22 and the torque commands Tm1* and Tm2* of the motors MG1 and MG2 to the engine ECU 24 and the motor ECU 40 (steps S510 to S560) like the processing of steps S310 to S360 in the routine of FIG. 6 and terminates this drive control routine.

When it is determined that the required engine power Pe* is less than the value obtained by subtracting the predetermined power β from the threshold value Pstart at step S490, on the other hand, the CPU 72 stops operation of the engine 22 (step S570). The CPU 72 performs the processing of steps S450 to S470 to set and send the torque commands Tm1* and Tm2* of the motors MG1 and MG2 to the motor ECU 40 to enable the motor drive and then terminates the drive control routine.

This drive control routine in hybrid drive priority mode performed during setting of the hybrid drive priority mode to the drive mode enables the motor drive when the required engine power Pe* is equal to or less than the HV priority time-judging power Phv, while enabling the hybrid drive when the required engine power Pe* is greater than the HV priority time-judging power Phv.

The following describes drive control to start the engine 22 during drive in the motor drive priority mode or in the hybrid drive priority mode. When the start-up time drive control routine of FIG. 8 is triggered, the CPU 72 of the hybrid electronic control unit 70 inputs data required for control, e.g., the accelerator opening Acc, the vehicle speed V, the rotational speed Ne of the engine 22, the rotational speeds Nm1 and Nm2 of the motors MG1 and MG2 and the input and output limits Win and Wout of the battery 50 (step S600) and sets the required torque Tr* to be output to the ring gear shaft 32a or the driveshaft and the drive power Pdrv* which the vehicle is required to output for driving based on the input accelerator opening Acc and vehicle speed V (step S610). This processing is similar to the processing of steps S200 and S210 in the routine of FIG. 6, except input of the rotational speed Ne of the engine 22 at step S600. The rotational speed Ne of the engine 22 is calculated based on the signal from the crank position sensor 140 and is input from the engine ECU 24 by communication.

The CPU 72 subsequently sets a motoring torque Tst, which is a torque specified to increase the rotational speed Ne of the engine 22 to or above a predetermined rotational speed Nref (for example, 1000 rpm or 1200 rpm) as the lower limit of the rotational speed that enable stable operation of the engine 22, to the torque command Tm1* of the motor MG1 (step S620), sets the torque command Tm2* of the motor MG2 (steps S630 to S650) in the same manner as the processing of steps S330 to S350 in the routine of FIG. 6, and sends the set torque commands Tm1* and Tm2* to the motor ECU 40 (step S660). The CPU 72 then determines whether the rotational speed Ne of the engine 22 is equal to or greater than a specified rotational speed Nst (for example, 600 rpm or 700 rpm), which is specified as the rotational speed to start fuel injection control and ignition control irrespective of the rotational speed Ne of the engine 22 that is equal to or less than the predetermined rotational speed Nref (step S670). When the rotational speed Ne of the engine 22 is determined to be less than the specified rotational speed Nst, the CPU 72 returns the processing to step S600 and repeats the processing of steps S600 to S670 until the rotational speed Ne of the engine 22 increases to or above the specified rotational speed Nst. In other words, until the rotational speed Ne of the engine 22 increases to or above the specified rotational speed Nst, the motors MG1 and MG2 are controlled in the range of the input and output limits Win and Wout of the battery 50 to cause the motor MG1 to output the motoring torque Tst and to cause the motor MG2 to output the sum of the required torque Tr* and a torque of cancelling out the torque output from the motor MG1 and applied to the ring gear shaft 32*a*. This enables motoring of the engine 22 during drive.

When the rotational speed Ne of the engine 22 increases to or above the specified rotational speed Nst during repetition of the processing of steps S600 to S670, the CPU 72 sends a control signal to start fuel injection control and ignition control to the engine ECU 24 (step S680). The engine ECU 24 receives the control signal and starts fuel injection control and ignition control of the engine 22. The CPU 72 determines whether the engine 22 is in the self-ignition state (step S690). When the engine 22 is not yet in the self-ignition state, the CPU 72 returns the processing to step S600. When the engine 22 is in self-ignition state, the CPU 72 terminates this drive control routine.

Figure 12:
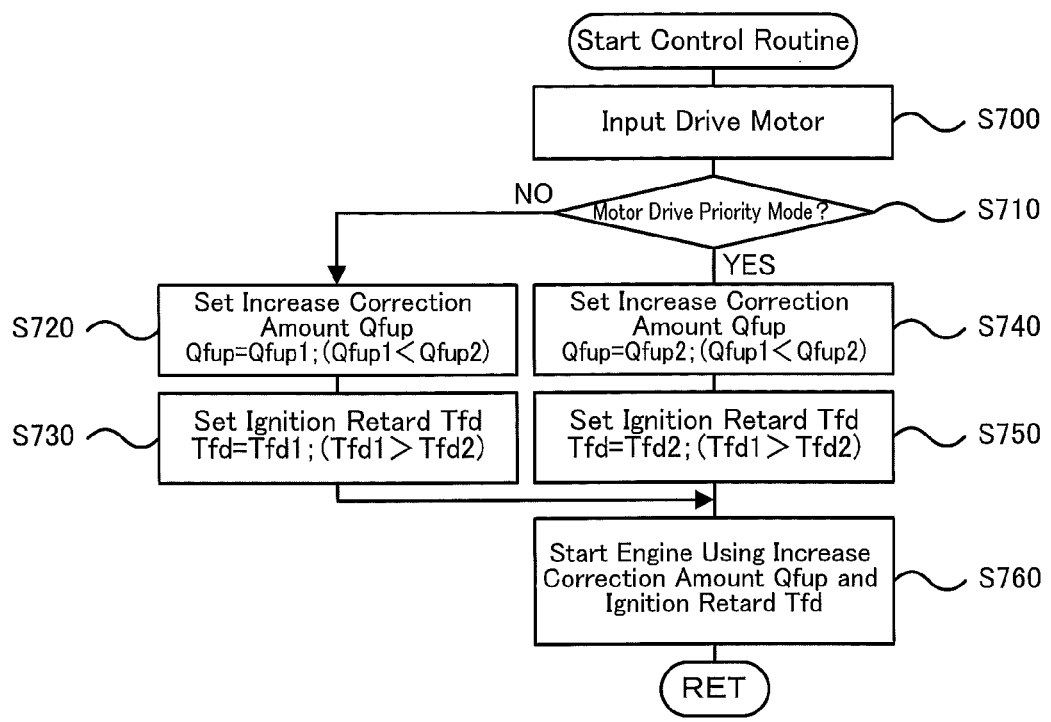
FIG. 12 is a flowchart showing an example flow of start control routine executed by an engine ECU 24.

The following describes control of the engine 22 to start the engine 22. FIG. 12 is a flowchart showing an example flow of start control routine performed by the engine ECU 24. This routine is triggered when the engine ECU 24 receives a control signal to start fuel injection control and ignition control from the hybrid electronic control unit 70.

When the start control routine is triggered, the CPU 24*a* of the engine ECU 24 inputs the drive mode (step S700) and determines whether the input drive mode is the motor drive priority mode or the hybrid drive priority mode (step S710). For convenience, the description first regards the start control when the drive mode is the hybrid drive priority mode and then regards the start control when the drive mode is the motor drive priority mode.

When the drive mode is the hybrid drive priority mode, the CPU 24*a* sets a value Qfup1 to an increase correction amount Qfup, which is specified as a correction amount to give an increase to a base amount of fuel injection Qfb (amount of fuel injection set based on the amount of intake air Qa of the engine 22 to achieve a specified air-fuel ratio (for example, stoichiometric air-fuel ratio)) (step S720) and sets a value Tfd1 to an ignition retard Tfd, which is specified as a correction amount to delay the ignition timing from a specific ignition timing that allows for efficient operation of the engine 22 (fuel consumption-based ignition timing) (step S730). The CPU 24*a* starts fuel injection control using a target amount of fuel injection Qf* based on the set increase correction amount Qfup and ignition control using a target ignition timing Tf* based on the set ignition retard Tfd to start the engine 22 (step S760). When the engine 22 is started to the self-ignition state, this start control routine is terminated. The value Qfup1 and the value Tfd1 may be determined in advance by experiment or analysis as correction values that do not cause a torque of increasing the rotational speed Ne of the engine 22 (hereinafter referred to as positive engine torque) to be applied to the carrier 34 of the power distribution-integration mechanism 30 at the first igniting time (for example, the torque of the engine 22 at the first igniting time substantially balances with the friction of the engine 22). The value Qfup1 may be a fixed value or may be a value of decreasing tendency with time (decreasing the target amount of fuel injection Qf*). The value Tfd1 may be a fixed value or may be a value of decreasing tendency with time (advancing the target ignition timing Tf*). Starting the engine 22 in this manner prevents a potential shock at the first igniting time.

When the drive mode is the motor drive priority mode at step S710, the CPU 24*a* sets a value Qfup2 that is larger than the value Qfup1 to the increase correction amount Qfup (step S740), sets a value Tfd2 that is smaller than the value Tfd1 to the ignition retard Tfd (step S750) and starts fuel injection control using the target amount of fuel injection Qf* based on the set increase correction amount Qfup and ignition control using the target ignition timing Tf* based on the set ignition retard Tfd to start the engine 22 (step S760). When the engine 22 is started to the self-ignition state, this start control routine is terminated. The value Qfup2 may be a fixed value or may be a value of decreasing tendency with time (decreasing the target amount of fuel injection Qf*). The value Tfd2 may be a fixed value or may be a value of decreasing tendency with time (advancing the target ignition timing Tf*). Increasing the amount of fuel injection than that in the hybrid drive priority mode raises the possibility that the first igniting state is achieved within a predetermined number of ignitions (for example, once or twice) after the start of ignition control. In other words, this decreases the number of ignitions (reduces the time) to the first igniting state as the average of a plurality of starts of the engine 22. Advancing the ignition timing than that in the hybrid drive priority mode advances the timing to the first igniting state. By increasing the amount of fuel injection in combination with advancing the ignition timing than those in the hybrid drive priority mode, it is expected that the output torque of the engine 22 exceeds the friction of the engine 22 at the first igniting time and that the positive engine torque is applied to the carrier 34 of the power distribution-integration mechanism 30 and is transmitted to the ring gear shaft 32*a* or the driveshaft via the power distribution-integration mechanism 30. This shortens the time period between the start of motoring the engine 22 by the motor MG1 and the start of application of the positive engine torque to the carrier 34 in the first igniting state of the engine 22 (hereinafter referred to as positive engine torque-required time) during drive in the motor drive priority mode than during drive in the hybrid drive priority mode.

As described above, during motor drive in the motor drive priority mode, when the drive power Pdrv* exceeds the output limit-equivalent power (kw·Wout), the engine 22 is motored and started by the motor MG1. During motor drive in the hybrid drive priority mode, on the other hand, when the required engine power Pe* exceeds the relatively small HV priority time-judging power Phv, the engine 22 is motored and started by the motor MG1. In general, the engine 22 is motored and started by the motor MG1 under the condition of the greater required torque Tr* in the former case than in the latter case. The torque of the motor MG2 is thus liable to be restricted by the torque limit Tm2 max based on the output limit Wout of the battery 50 and tends to increase the possibility of a shock due to a fluctuation of the torque (insufficiency relative to the required torque Tr*) output to the ring gear shaft 32*a* or the driveshaft. In this circumstance, the longer positive engine torque-required time may cause the driver to separately feel a shock caused by motoring the engine 22 and a shock caused by the start of application of a positive torque to the carrier 34 of the power distribution-integration mechanism 30. This embodiment, on the other hand, increases the amount of fuel injection and/or advances the ignition timing to shorten the positive engine torque-required time in the case that the engine 22 is motored and started by the motor MG1 during drive in the motor drive priority mode, compared with the case that the engine 22 is motored and started by the motor MG1 during drive in the hybrid drive priority mode. This enables the shock caused by motoring the engine 22 to be at least partly overlapped with the shock caused by the start of application of a positive torque to the carrier 34 of the power distribution-integration mechanism 30, thereby preventing the driver from separately feeling shocks a plurality of different times.

FIG. 13 is a diagram schematically illustrating time changes of the rotational speed Ne of the engine 22, the amount of fuel injection Qf, the ignition timing Tf and the carrier torque Tc as the torque applied to the carrier 34 of the power distribution-integration mechanism 30 when the engine 22 is started during drive in the motor drive priority mode and in the hybrid drive priority mode. In this time chart, the negative carrier torque Tc means that the torque by explosive combustion is smaller than the friction (rotational resistance) before the first igniting time or after the first igniting time. As illustrated, when the engine 22 is motored and started by the motor MG1 to increase the rotational speed Ne of the engine 22 to or above the predetermined rotational speed Nst (time t1), this control starts the engine 22 with the increased amount of fuel injection Qf and the advanced ignition timing Tf to shorten the positive engine torque-required time during drive in the motor drive priority mode, compared with during drive in the hybrid drive priority mode.

In the hybrid vehicle 20 of the embodiment described above, in the case that the engine 22 is motored and started by the motor MG1 during drive in the motor drive priority mode, the motors MG1 and MG2 are controlled in the range of the input and output limits Win and Wout of the battery 50, such that the motor MG1 outputs the motoring torque Tst and the motor MG2 outputs the sum of the required torque Tr* and the torque of cancelling out the torque output from the motor MG1 and applied to the ring gear shaft 32a. The engine 22 is controlled, such that the engine 22 is started with the increased fuel supply and the ignition at the advanced ignition timing, compared with the case that the engine 22 is motored and started by the motor MG1 during drive in the hybrid drive priority mode. This enables the shock caused by motoring the engine 22 to be at least partly overlapped with the shock caused by the start of application of a positive torque to the carrier 34 of the power distribution-integration mechanism 30, thereby preventing the driver from separately feeling shocks at a plurality of different timings.

In the hybrid vehicle 20 of the embodiment, the control increases the amount of fuel injection and advances the ignition timing in the case that the engine 22 is motored and started by the motor MG1 during drive in the motor drive priority mode, compared with the case that the engine 22 is motored and started by the motor MG1 during drive in the hybrid drive priority mode. According to modifications, the control may increase the amount of fuel injection while keeping the ignition timing unchanged or may advance the ignition timing while keeping the amount of fuel injection unchanged.

When the engine 22 is motored and started by the motor MG1 during drive in the hybrid drive priority mode, the hybrid vehicle 20 of the embodiment sets the value Qfup1 to the increase correction amount Qfup and the value Tfd1 to the ignition retard Tfd and starts the engine 22 with fuel injection control using the target amount of fuel injection Qf* based on the set increase correction amount Qfup and ignition control using the target ignition timing Tf* based on the set ignition retard Tfd. When the engine 22 is motored and started by the motor MG1 during drive in the motor drive priority mode, on the other hand, the hybrid vehicle 20 sets the value Qfup2 larger than the value Qfup1 to the increase correction amount Qfup and the value Tfd2 smaller than the value Tfd1 to the ignition retard Tfd and starts the engine 22 with fuel injection control using the target amount of fuel injection Qf* based on the set increase correction amount Qfup and ignition control using the target ignition timing Tf* based on the set ignition retard Tfd. According to one modification, the relationships between the increase correction amount Qfup and the time elapsed since the start of fuel injection control with regard to the respective drive modes may be provided in advance as an increase correction amount setting map and stored in the ROM 24b. The increase correction amount Qfup may be read from the map corresponding to the drive mode and the time elapsed since the start of fuel injection control. Similarly, the relationships between the ignition retard Tfd and the time elapsed since the start of ignition control with regard to the respective drive modes may be provided in advance as an ignition retard setting map and stored in the ROM 24b. The ignition retard Tfd may be read from the map corresponding to the drive mode and the time elapsed since the start of ignition control.

In the hybrid vehicle 20 of the embodiment, during motor drive in the motor drive priority mode, the engine 22 is motored and started by the motor MG1 when the drive power Pdrv* exceeds the output limit-equivalent power (kw·Wout). During motor drive in the hybrid drive priority mode, on the other hand, the engine 22 is motored and started by the motor MG1 when the required engine power Pe* exceeds the HV priority time-judging power Phv. There may be many modifications as long as the priority is given to the motor drive in the motor drive priority mode over the motor drive in the hybrid drive priority mode. According to one modification, during motor drive in the motor drive priority mode, the engine 22 may be motored and started by the motor MG1 when the required torque Tr* exceeds a predetermined threshold value Tref1. During motor drive in the hybrid drive priority mode, on the other hand, the engine 22 may be motored and started by the motor MG1 when the required torque Tr* exceeds a predetermined threshold value Tref2 that is smaller than the threshold value Tref1.

The foregoing describes the operations of the hybrid vehicle 20 of the embodiment to motor and start the engine 22 by the motor MG1 during drive in the motor drive priority mode and in the hybrid drive priority mode. When the engine 22 is motored and started by the motor MG1 in response to, for example, a heating demand from a heater (not shown) to heat the vehicle interior with the heat energy of the engine 22 during the vehicle stop, there is a little possibility that the torque of the motor MG2 is restricted by the input and output limits Win and Wout of the battery 50. Whether the drive mode is the motor drive priority mode or the hybrid drive priority mode, as in the case of motoring and starting the engine 22 by the motor MG1 during drive in the hybrid drive priority mode described above, the control may set the value Qfup1 to the increase correction amount Qfup and the value Tfd1 to the ignition retard Tfd and start the engine 22 with fuel injection control using the target amount of fuel injection Qf* based on the set increase correction amount Qfup and ignition control using the target ignition timing Tf* based on the set ignition retard Tfd.

The following describes the correspondence relationship between the primary elements of the embodiment and the primary elements of the invention described in Solution to Problem. The engine 22 of the embodiment corresponds to the "internal combustion engine", the motor MG1 to the "generator", the power distribution-integration mechanism 30 to the "planetary gear mechanism", the motor MG2 to the "motor" and the battery 50 to the "secondary battery". The hybrid electronic control unit 70 that executes the processing of step S210 in the drive control routine in motor drive priority mode of FIG. 6, the processing of step S410 in the drive control routine in hybrid drive priority mode of FIG. 7, and the processing of step S610 in the start-up time drive control routine of FIG. 8 to set the required torque Tr* based on the accelerator opening Acc and the vehicle speed V corresponds to the "required torque setter". The battery ECU 52 that sets the output limit Wout of the battery 50 based on the state of charge SOC and the battery temperature Tb of the battery 50 corresponds to the "output limit setter". The "drive mode setter" corresponds to the hybrid electronic control unit 70 that executes the drive mode setting routine of FIG. 5 to set the drive mode to the motor drive priority mode until the state of charge SOC of the battery 50 decreases below the threshold value Sref2 (for example, 20% or 30%) smaller than the threshold value Sref1 (for example, 40% or 50%) when the state of charge SOC of the battery 50 is equal to or greater than the threshold value Sref1 at the system start-up, and to set the drive mode to the hybrid drive priority mode when the state of charge SOC of the battery 50 is less than the threshold value Sref1 at the system start-up or when the state of charge SOC of the battery 50 is equal to or greater than the threshold value Sref1 at the system start-up and subsequently decreases below the threshold value Sref2.

According to the correspondence relationship between the embodiment and the first hybrid vehicle of the invention, the "controller" corresponds to: the hybrid electronic control unit 70 that executes the start-up time drive control routine of FIG. 8 to set and send the torque commands Tm1* and Tm2* of the motors MG1 and MG2 to the motor ECU 40 in the range of the input and output limits Win and Wout of the battery 50 when the engine 22 is motored and started by the motor MG1, such that the motor MG1 outputs the motoring torque Tst and the motor MG2 output the sum of the required torque Tr* and the torque of cancelling out the torque output from the motor MG1 and applied to the ring gear shaft 32a, and to send a control signal to the engine ECU 24 to start fuel injection control and ignition control of the engine 22 when the rotational speed Ne of the engine 22 increases to or above the predetermined rotational speed Nst; the motor ECU 40 that controls the motors MG1 and MG2 based on the torque commands Tm1* and Tm2*; and the engine ECU 24 that executes the start control routine of FIG. 12 to control the engine 22 to be started with the increased fuel supply during drive in the motor drive priority mode compared with during drive in the hybrid drive priority mode, in response to reception of the control signal to start the fuel injection control and the ignition control from the hybrid electronic control unit 70.

According to the correspondence relationship between the embodiment and the second hybrid vehicle of the invention, the "controller" corresponds to: the hybrid electronic control unit 70 that executes the start-up time drive control routine of FIG. 8 to set and send the torque commands Tm1* and Tm2* of the motors MG1 and MG2 to the motor ECU 40 in the range of the input and output limits Win and Wout of the battery 50 when the engine 22 is motored and started by the motor MG1, such that the motor MG1 outputs the motoring torque Tst and the motor MG2 output the sum of the required torque Tr* and the torque of cancelling out the torque output from the motor MG1 and applied to the ring gear shaft 32a, and to send a control signal to the engine ECU 24 to start fuel injection control and ignition control of the engine 22 when the rotational speed Ne of the engine 22 increases to or above the predetermined rotational speed Nst; the motor ECU 40 that controls the motors MG1 and MG2 based on the torque commands Tm1* and Tm2*; and the engine ECU 24 that executes the start control routine of FIG. 12 to control the engine 22 to be started with the advanced injection timing during drive in the motor drive priority mode compared with during drive in the hybrid drive priority mode, in response to reception of the control signal to start the fuel injection control and the ignition control from the hybrid electronic control unit 70.

In the first hybrid vehicle or the second hybrid vehicle of the invention, the "internal combustion engine" is not limited to the internal combustion engine that consumes the hydrocarbon fuel such as gasoline or light oil to output power but may be any of other types of internal combustion engines, such as hydrogen engine. The "generator" is not limited to the motor MG1 provided as the synchronous motor-generator but may be any of other types of generators having power input and output capabilities, such as induction motor. The "planetary gear mechanism" is not limited to the power distribution-integration mechanism 30 described above but may be any mechanism having three rotational elements respectively connected with three shafts, i.e., the driveshaft linked with the axle, the output shaft of the internal combustion engine and the rotating shaft of the generator, for example, a double pinion-type planetary gear mechanism or a combination of multiple planetary gear mechanisms to be connected with four or more shafts. The "motor" is not limited to the motor MG2 provided as the synchronous motor-generator but may be any of other types of motors having power input and output capabilities from and to the driveshaft, such as induction motor. The "secondary battery" is not limited to the battery 50 provided as the lithium ion secondary battery but may be any of other types of secondary batteries having electric power transmission capability to and from the generator and the motor, such as nickel-metal hydride battery, nickel-cadmium battery or lead-acid battery. The "required torque setter" is not limited to the configuration of setting the required torque Tr* based on the accelerator opening Acc and the vehicle speed V, but may have any configuration of setting the required torque for driving, for example, configuration of setting the required torque Tr* based on only the accelerator opening Acc. The "output limit setter" is not limited to the configuration of setting the output limit Wout of the battery 50 based on the state of charge SOC and the battery temperature Tb of the battery 50, but may have any configuration of setting the output limit as the maximum allowable power output from the secondary battery according to the state of the secondary battery, for example, configuration of setting the output limit Wout of the battery 50 based on the internal resistance of the battery 50 in addition to the state of charge SOC and the battery temperature Tb. The "drive mode setter" is not limited to the configuration of setting the drive mode to the motor drive priority mode until the state of charge SOC of the battery 50 decreases below the threshold value Sref2 (for example, 20% or 30%) smaller than the threshold value Sref1 (for example, 40% or 50%) when the state of charge SOC of the battery 50 is equal to or greater than the threshold value Sref1 at the system start-up, and of setting the drive mode to the hybrid drive priority mode when the state of charge SOC of the battery 50 is less than the threshold value Sref1 at the system start-up or when the state of charge SOC of the battery 50 is equal to or greater than the threshold value Sref1 at the system start-up and subsequently decreases below the threshold value Sref2, but may have any configuration of setting the drive mode to one of the motor drive priority mode that gives priority to the motor drive over the hybrid drive and the hybrid drive priority mode that gives priority to the hybrid drive over the motor drive.

In the first hybrid vehicle of the invention, the "controller" is not limited to the combination of the hybrid electronic control unit 70, the engine ECU 24 and the motor ECU 40 but may be provided as a single electronic control unit. The "controller" is not limited to the control of controlling the motors MG1 and MG2 in the range of the input and output limits Win and Wout of the battery 50 and controlling the engine 22 in the case that the engine 22 is motored and started by the motor MG1 during drive in the motor drive priority mode, such that the motor MG1 outputs the motoring torque Tst, the motor MG2 output the sum of the required torque Tr* and the torque of cancelling out the torque output from the motor MG1 and applied to the ring gear shaft 32a, and the engine 22 is started with the increased fuel supply compared with the case that the engine 22 is motored and started by the motor MG1 during drive in the hybrid drive priority mode. The "controller" may, however, perform any control of controlling the motor and the generator in the range of the output limit and controlling the internal combustion engine at the start-up time in motor drive priority mode when the internal combustion engine is motored and started by the generator during drive in the motor drive priority mode, such that the generator outputs the torque for motoring the internal combustion engine, the motor outputs the sum of the required torque and the torque of cancelling out the torque output from the generator and applied to the driveshaft, and the internal combustion engine is started with the increased fuel supply compared with the start-up time in hybrid drive priority mode when the internal combustion engine is motored and started by the generator during drive in the hybrid drive priority mode.

In the second hybrid vehicle of the invention, the "controller" is not limited to the combination of the hybrid electronic control unit 70, the engine ECU 24 and the motor ECU 40 but may be provided as a single electronic control unit. The "controller" is not limited to the control of controlling the motors MG1 and MG2 in the range of the input and output limits Win and Wout of the battery 50 and controlling the engine 22 in the case that the engine 22 is motored and started by the motor MG1 during drive in the motor drive priority mode, such that the motor MG1 outputs the motoring torque Tst, the motor MG2 output the sum of the required torque Tr* and the torque of cancelling out the torque output from the motor MG1 and applied to the ring gear shaft 32a, and the engine 22 is started with the advanced ignition timing compared with the case that the engine 22 is motored and started by the motor MG1 during drive in the hybrid drive priority mode. The "controller" may, however, perform any control of controlling the motor and the generator in the range of the output limit and controlling the internal combustion engine at the start-up time in motor drive priority mode when the internal combustion engine is motored and started by the generator during drive in the motor drive priority mode, such that the generator outputs the torque for motoring the internal combustion engine, the motor outputs the sum of the required torque and the torque of cancelling out the torque output from the generator and applied to the driveshaft, and the internal combustion engine is started with the advanced ignition timing compared with the start-up time in hybrid drive priority mode when the internal combustion engine is motored and started by the generator during drive in the hybrid drive priority mode.

The correspondence relationship between the primary elements of the embodiment and the primary elements of the invention described in SUMMARY is only illustrative and should not be considered to limit the elements of the invention described in SUMMARY, since the embodiment is only illustrative to specifically describe the aspects of the invention described in SUMMARY. In other words, the invention described in SUMMARY should be interpreted on the basis of the description in SUMMARY, and the embodiment is only the specific example of the invention described in SUMMARY.

The invention is not limited to the above embodiment but various modifications and variations may be made to the embodiment without departing from the scope of the invention.

INDUSTRIAL APPLICABILITY

The present invention is applicable to, for example, manufacturing industries of hybrid vehicles.

The invention claimed is:

1. A hybrid vehicle comprising: an internal combustion engine; a generator having power input and output capabilities; a planetary gear mechanism having three rotational elements respectively connected with three shafts, i.e., a driveshaft linked with an axle, an output shaft of the internal combustion engine and a rotating shaft of the generator; a motor having power input and output capabilities from and to the driveshaft; and a secondary battery having electric power transmission capability to and from the generator and the motor, the hybrid vehicle enabling a hybrid drive with both power output from the internal combustion engine and power input from and output to the motor and a motor drive with only the power input from and output to the motor, the hybrid vehicle further comprising:

a required torque setter configured to set a required torque for driving;

an output limit setter configured to set an output limit that is a maximum allowable power output from the secondary battery according to a state of the secondary battery;

a drive mode setter configured to set a drive mode to one of a motor drive priority mode that gives priority to the motor drive over the hybrid drive and a hybrid drive priority mode that gives priority to the hybrid drive over the motor drive; and a controller configured to control the motor and the generator in a range of the set output limit and control the internal combustion engine at a start-up time in motor drive priority mode when the internal combustion engine is motored and started by the generator in the motor drive priority mode set to the drive mode by the drive mode setter, such that the generator outputs a torque for motoring the internal combustion engine, the motor outputs sum of the set required torque and a torque of cancelling out a torque output from the generator and applied to the driveshaft, and the internal combustion engine is started with advanced ignition timing, compared with a start-up time in hybrid drive priority mode when the internal combustion engine is motored and started by the generator in the hybrid drive priority mode set to the drive mode by the drive mode setter.

2. The hybrid vehicle according to claim 1, wherein the controller controls the internal combustion engine to be started with increased fuel supply at the start-up time in motor drive priority mode, compared with at the start-up time in hybrid drive priority mode.

3. The hybrid vehicle according to claim 1, wherein during the motor drive in the motor drive priority mode set to the drive mode by the drive mode setter, when a drive power which the vehicle is required to output for driving exceeds an output limit-equivalent power that is a power equivalent to the output limit of the secondary battery, the controller controls the internal combustion engine to be motored and started by the generator, and during the motor drive in the hybrid drive priority mode set to the drive mode by the drive mode setter, when a required engine power to be output from the internal combustion engine exceeds a threshold power that is specified as a smaller value than a lower limit of the output limit-equivalent power in the motor drive priority mode set to the drive mode by the drive mode setter, the controller controls the internal combustion engine to be motored and started by the generator.

4. The hybrid vehicle according to claim 1, further comprising:

a charger connected to an external power source during a system stop and operated to charge the secondary battery with electric power from the external power source; and a state-of-charge calculator configured to calculate a state-of-charge of the secondary battery to an entire capacity of power storage according to the state of the secondary battery, wherein when the state of charge calculated at a system start-up time is equal to or greater than a predetermined first rate, the drive mode setter sets the drive mode to the motor drive priority mode until the calculated state of charge decreases below a predetermined second rate that is smaller than the predetermined first rate, and unless the drive mode is set to the motor drive priority mode, the drive mode setter sets the drive mode to the hybrid drive priority mode.

* * * * *